(12) United States Patent
Hirano et al.

(10) Patent No.: US 6,653,383 B2
(45) Date of Patent: Nov. 25, 2003

(54) CERAMIC SLURRY COMPOSITION, CERAMIC MOLDING, AND CERAMIC ELECTRONIC COMPONENT

(75) Inventors: Atsushi Hirano, Gamo-gun (JP); Tomoya Yokoyama, Sabae (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 09/918,235

(22) Filed: Jul. 30, 2001

(65) Prior Publication Data

US 2002/0055571 A1 May 9, 2002

(30) Foreign Application Priority Data

Jul. 28, 2000 (JP) .......................................... 2000-229749
Dec. 27, 2000 (JP) .......................................... 2000-398565

(51) Int. Cl.[7] .............................. C08J 3/00; C08K 3/20; C08L 75/00; B32B 27/00; B32B 27/40
(52) U.S. Cl. ..................... 524/413; 428/423.1; 524/591; 524/839; 524/840
(58) Field of Search ................................ 524/591, 839, 524/840, 413; 428/423.1

(56) References Cited

U.S. PATENT DOCUMENTS

| 3,998,917 | A | * | 12/1976 | Adelman |
| 4,263,843 | A |   | 4/1981 | Hammersmith et al. |
| 4,353,958 | A | * | 10/1982 | Kita et al. |
| 5,389,428 | A | * | 2/1995 | Fleming et al. |
| 5,494,960 | A | * | 2/1996 | Rolando et al. |

FOREIGN PATENT DOCUMENTS

| JP | 05-117407 | 5/1993 |
| KR | 8301883 | 5/1983 |

* cited by examiner

Primary Examiner—Patrick D. Niland
(74) Attorney, Agent, or Firm—Dickstein, Shapiro, Morin & Oshinsky, LLP.

(57) ABSTRACT

A ceramic slurry composition, in which the content of an organic binder is reduced, the organic binder can be heated and removed in a short time, and the degree of shrinkage during baking is reduced, is provided. The ceramic slurry composition is composed of a ceramic powder and an organic vehicle containing an aqueous solvent and a polyurethane resin having an average particle diameter of about 300 nm or less. The organic vehicle is in an emulsion state in which fine particles of the polyurethane resin are dispersed in the aqueous solvent.

19 Claims, 7 Drawing Sheets

CERAMIC SLURRY COMPOSITION, CERAMIC MOLDING, AND CERAMIC ELECTRONIC COMPONENT

BACKGROUND OF THE INVENTION

1. Field of the Invention

The present invention relates to a ceramic slurry composition composed of a ceramic powder and an organic vehicle containing an organic binder and a solvent, a ceramic molding formed from said ceramic slurry composition, and a ceramic electronic component using said ceramic molding.

2. Description of the Related Art

A ceramic molding, in particular, a ceramic green sheet has hitherto been formed by applying a predetermined thickness of coating of a ceramic slurry made of a mixture of, for example, a ceramic powder and an organic vehicle containing an organic binder and a solvent using a doctor blade method, etc., on a carrier tape and by drying this so as to volatilize and remove the solvent.

As the organic binder used for a conventional ceramic molding, for example, thermoplastic resins can be mentioned, of which acrylic resins and polyvinyl alcohol (PVA) are typical examples.

As the manufacturing method for the ceramic molding, slip casting, injection molding, extrusion molding, thick film printing molding, etc., other than the aforementioned sheet molding, can be mentioned.

The organic binder in the ceramic slurry adsorbs on the surface of the ceramic powder and coagulates during the drying after the sheet molding so as to impart a shape maintenance property to the ceramic green sheet. In order to produce a ceramic molding having a desired strength and elongation, that is, in order to achieve sufficient adsorption and coagulation of the ceramic powder, in general, 10 to 15 parts by weight of organic binder is necessary relative to 100 parts by weight of the ceramic powder.

As a consequence, it takes much time to heat and remove the aforementioned large quantities of organic binder, and furthermore, since the degree of shrinkage accompanying the sintering of the ceramic molding is increased, deformation and warp are likely to occur in the resulting ceramic sintered material.

SUMMARY OF THE INVENTION

The present invention was made to solve the aforementioned problems. Accordingly, it is an object of the present invention to provide a ceramic molding in which a content of an organic binder is reduced and the organic binder can be heated and removed in a short time, and a ceramic electronic component using the ceramic molding.

According to an aspect of the present invention, a ceramic slurry composition composed of a ceramic powder and an organic vehicle containing an organic binder, which is made of a polyurethane resin, and a solvent is provided, wherein the organic vehicle is in an emulsion state in which fine particles of the aforementioned polyurethane resin are dispersed in the aforementioned solvent.

In the ceramic slurry composition according to the present invention, the average particle diameter of the aforementioned polyurethane resin is preferably about 300 nm or less.

The content of the aforementioned polyurethane resin in the aforementioned ceramic slurry is preferably about 8 parts by weight or less relative to 100 parts by weight of the ceramic powder.

The ceramic slurry composition according to the present invention is preferably further composed of a cross-linking agent.

The aforementioned solvent may be primarily composed of water.

Furthermore, the aforementioned polyurethane resin is preferably a resin selected from the group consisting of an anionic polyurethane resin, a nonionic polyurethane resin, and an anionic and nonionic polyurethane resin.

According to another aspect of the present invention, a ceramic molding produced by forming the aforementioned ceramic slurry composition of the present invention into a predetermined shape is provided. The aforementioned ceramic molding may be a ceramic green sheet produced by forming the aforementioned ceramic slurry into a sheet and by drying the resulting sheet.

According to another aspect of the present invention, a ceramic electronic component including a ceramic element and terminal electrodes formed so as to contact with the aforementioned ceramic element is provided, wherein the aforementioned ceramic element is produced by baking the ceramic molding of the present invention.

According to another aspect of the present invention, a ceramic electronic component including a ceramic element produced by laminating a plurality of ceramic layers, and terminal electrodes formed so as to contact with said ceramic element is provided, wherein the aforementioned ceramic layer is produced by baking the ceramic molding of the present invention.

Since the ceramic slurry composition according to the present invention is composed of the organic vehicle, which contains the organic binder made of a polyurethane resin, and which is in an emulsion state, and the solvent, the content of the organic binder in the ceramic slurry can be reduced. That is, lumps of coagulated surplus organic binder are reduced, and superior tensile strength and elongation can be provided.

In particular, when this is baked in order to produce a ceramic electronic component, the organic binder can be heated and removed in a short time, and furthermore, the degree of shrinkage accompanying the sintering of the ceramic molding is reduced, so that a high precision ceramic electronic component in which deformation and warp are reduced can be produced.

In the present invention, the average particle diameter of the polyurethane resin in the aforementioned ceramic slurry is preferably about 300 nm or less. By using fine particles of the polyurethane resin, superior tensile strength and elongation can be provided, and the content of the organic binder can be further reduced.

When the content of the polyurethane resin in the aforementioned ceramic slurry is specified to be about 8 parts by weight or less relative to 100 parts by weight of the ceramic powder, superior tensile strength and elongation can be achieved in spite of further reduced content of the organic binder.

When the aforementioned ceramic slurry is further composed of a cross-linking agent, superior tensile strength and elongation can be achieved in spite of further reduced content of the organic binder.

In particular, when the solvent in the ceramic slurry is primarily composed of water, an organic binder composed of a resin selected from the group consisting of an anionic polyurethane resin, a nonionic polyurethane resin, and an anionic and nonionic polyurethane resin can be used.

Among these, when the nonionic polyurethane resin or the anionic and nonionic polyurethane resin is used, there is no fear of reaction between metal ions eluted from the ceramic powder in the ceramic slurry and hydrophilic groups of the polyurethane resin. Therefore, it is not necessary to add an excessive additive, etc., and reduction of the density of the ceramic molding can be prevented. That is, the increase of pore and increase in pore diameter in the ceramic element produced by baking the ceramic molding can be prevented.

DESCRIPTION OF THE PREFERRED EMBODIMENTS

Figure 1:
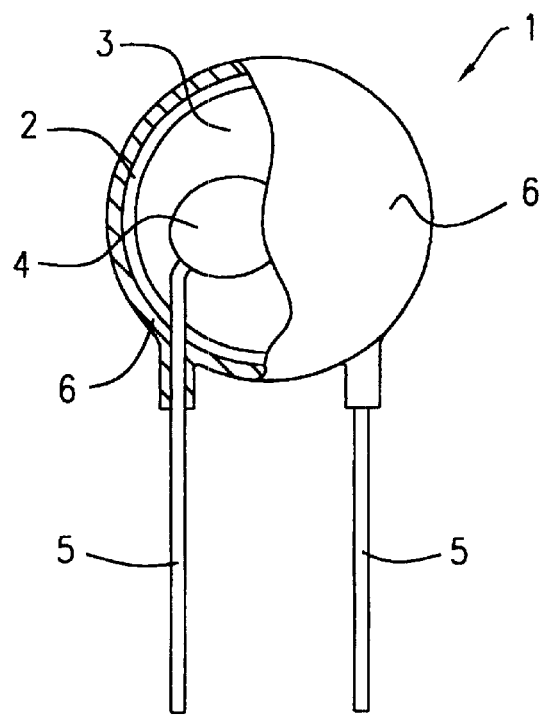
FIG. 1 is a sectional view of a ceramic electronic component according to an embodiment of the present invention.

The ceramic molding according to the present invention must use an organic vehicle in a state of an emulsion in which fine particles of a polyurethane resin are dispersed in a solvent. In the present invention, "emulsion" refers to every liquid in which another liquid not dissolved therein is dispersed as fine droplets (fine particles), and a so-called colloidal dispersion is included therein.

The reasons the polyurethane resin emulsion is selected as the organic vehicle in the ceramic molding according to the present invention broadly fall into the following three points.

First, since the polyurethane resin has an urethane linkage, and hydrogen bonds occur between N—H and C=O in the urethane linkage portion, and between N—H in the urethane linkage portion and O in the polyol portion, it has superior molecular cohesive force.

Second, since the polyurethane resin has a segment structure in which a hard segment portion exhibits strength and a soft segment portion exhibits flexibility, by a combination of these, a ceramic molding which satisfies desired strength and elongation can be produced.

Third, the emulsion has a large molecular weight, superior film making property compared to that of solution type organic binders, and superior dispersibility due to a low viscosity. Since the polyurethane resin has the aforementioned characteristics, even when the content in the ceramic slurry is reduced, a ceramic molding having strength and elongation suitable for working can be produced.

As the organic binder, in addition to conventionally used anionic polyurethane resins, nonionic polyurethane resins or anionic and nonionic polyurethane resins can be used. Herein, an "anionic and nonionic" polyurethane resin refers to a polyurethane resin including an anionic hydrophilic group as well as a nonionic hydrophilic group.

However, when anionic polyurethane resins are used, the polyurethane resin emulsion, in which the polyurethane resin is dispersed in the solvent sometimes coagulate. Subsequently, gelation or an increase in viscosity may occur. This is believed because metal ions eluted from the ceramic powder in the ceramic slurry react with anionic functional groups in the anionic polyurethane resin. As a measure against the eluted ions, additives, for example, tertiary amines, alkali carbonates, alkali hydrogencarbonates, etc., may be excessively added. As a consequence, the densities of the ceramic moldings may be reduced and pores may occur in the ceramic elements produced by baking the ceramic moldings due to excessive addition of additives for a measure against the coagulated polyurethane resin emulsion and the eluted ions.

On the other hand, when the nonionic polyurethane resins are used, reaction with the metal ions eluted from the ceramic powder do not occur since nonionic hydrophilic groups are included, so that ceramic slurries having desired stability can be produced. When the anionic and nonionic polyurethane resins are used, since anionic hydrophilic groups as well as nonionic hydrophilic groups are included, the degree of the reaction is reduced compared to that of the anionic polyurethane resin, so that ceramic slurries having desired stability can be produced.

The average particle diameter of the polyurethane resin is preferably about 300 nm or less. Accompanying a reduction in the average particle diameter of the polyurethane resin, if the content on a weight basis is equivalent, the relative density, the tensile strength and the elongation of the ceramic molding are increased, and furthermore, when the average particle diameter of the polyurethane resin is about 300 nm or less, if the content on a weight basis is equivalent, the improving effect on tensile strength and elongation becomes remarkable. The average particle diameter of the polyurethane resin is more preferably about 200 nm or less, and most preferably, is about 100 nm or less.

When common acrylic resins, etc., are used as the conventional organic binder, the ratio of the organic binder constituting the ceramic slurry has been 10 to 15 parts by weight relative to total quantity of the ceramic powder.

On the other hand, in the present invention, since even when the content of the organic binder is reduced, a relative density, tensile strength and elongation equivalent to, or more than, those in the aforementioned case, the content of the organic binder can be reduced to about 8 parts by weight or less relative to 100 parts by weight of the ceramic powder.

The content of the organic binder, and the tensile strength and the elongation are in nearly proportional relationship, and as described above, accompanying reduction in the average particle diameter of the polyurethane resin, the relative density, the tensile strength and the elongation of the ceramic molding are increased. Therefore, more specifically, for example, regarding a single plate ceramic electronic component in which the thickness of the ceramic molding is relatively thick as about 0.2 mm, when the average particle diameter of the polyurethane resin is about 300 nm, the content of the polyurethane resin is preferably about 5 to 7 parts by weight, when the average particle diameter is about 200 nm, the content is preferably about 4 to 6 parts by weight, when the average particle diameter is about 100 nm, the content is preferably about 3 to 5 parts by weight, and when the average particle diameter is less than 100 nm, the content is preferably about 1 to 3 parts by weight.

In the present invention, in order to improve the strength of the ceramic molding without increase in the content of the organic binder in the ceramic slurry, it is preferable to further add a cross-linking agent into the ceramic slurry. When the cross-linking agent is included, the fine particles of the polyurethane resins cross-link with each other through functional groups thereof, and a cross-linking structure is formed in the polyurethane resin emulsion, so that the strength of the resulting ceramic molding is improved. As the cross-linking agent, although not specifically limited, polyisocyanate is preferable. In particular, when an aqueous solution is used as a solvent, water-dispersible polyisocyanate is preferable.

As the solvent constituting the organic vehicle, a solvent primarily composed of water, in particular, an aqueous solution is preferable in consideration of the burden on the work environment and problems of after-treatment, etc.

As the ceramic molding according to the present invention, a ceramic green sheet which is sheet-molded using the ceramic slurry can be mentioned, although the present invention is not limited to this, and it may be a ceramic molding formed by, for example, slip casting, injection molding, extrusion molding, thick film printing molding, etc.

Next, an embodiment of the ceramic electronic component according to the present invention will be explained in detail with reference to FIG. 1.

As shown in FIG. 1, a ceramic electronic component 1 is composed of a ceramic element 2, terminal electrodes 3, solders 4, lead terminals 5 and an armor resin 6.

The ceramic element 2 is composed of a disk type sintered material produced by baking a ceramic molding according to the present invention sheet-molded from a ceramic slurry. The terminal electrodes 3 are composed of a pair of electrode films formed on both primary faces of the ceramic element 2. The solders 4 are formed on the terminal electrodes 3 in order to electrically and mechanically connect the terminal electrodes 3 and the lead terminals 5, respectively. The armor resin 6 is formed in order to cover the ceramic element 2, the terminal electrodes 3, and the solders 4.

As the ceramic element 2, an element made of a material which functions as, for example, a dielectric material, an insulator, a semiconductor, a piezoelectric material and a magnetic material, can be appropriately used. The shape of the ceramic element 2 as shown in FIG. 1 is a disk type, although the shape of the ceramic element 2 is not limited to the disk type, and, for example, a rectangular plate type, etc., can be appropriately used, as long as faces sufficient for forming the terminal electrodes 3 are provided.

The terminal electrodes 3 are electrode films formed on the both primary faces of the ceramic element 2, and, for example, when formed by electroless Ni plating, the films are formed as layers of Ni/P, Ni/B or Ni/Ag alloy, etc., depending on the kind of reducing agent components in plating baths. The shape and the size of the terminal electrode are not limited to the embodiment according to the present invention. For example, the terminal electrodes can be formed on all over the both primary faces of the ceramic element 2, or can be formed with gap widths of arbitrary shapes. In both cases, the effects of the present invention can be achieved. The number of layers of the terminal electrodes is not limited to the embodiment according to the present invention. For example, a terminal electrode of a second layer may be further formed on a terminal electrode of a first layer, and arbitrary number of layers may be formed.

Regarding the solders 4, materials, shapes, and sizes are not limited to the embodiment according to the present invention. For example, the solders 4 may be formed on all over the terminal electrodes 3, or may be formed on an arbitrary part of the terminal electrodes 3, and either case can be adopted.

Regarding the lead terminals 5, materials, shapes, and sizes are not limited to the embodiment according to the present invention. For example, a lead terminal, in which a core material is a metal wire made of Cu, Fe, Ni, Au, etc., and if necessary, the surface of the metal wire is plated with Sn, Cu, Pd, Au, Sn—Cu, Sn—Ag or Sn—Ag—Cu, can be appropriately used. The number of the lead terminals 5 connected to the terminal electrode 3 is not limited to the embodiment according to the present invention. At least two lead terminals 5 may be connected to the terminal electrode 3. There is no necessity to provide lead terminals 5.

As the armor resin 6, for example, epoxy resins and silicon resins can be mentioned, although not specifically limited to these, and typical resins can be appropriately used as long as those have superior insulation property, moisture resistance, shock resistance, heat resistance, etc. There is no necessity to provide the armor resin 6, although arbitrary number of layers may be formed.

Figure 2:
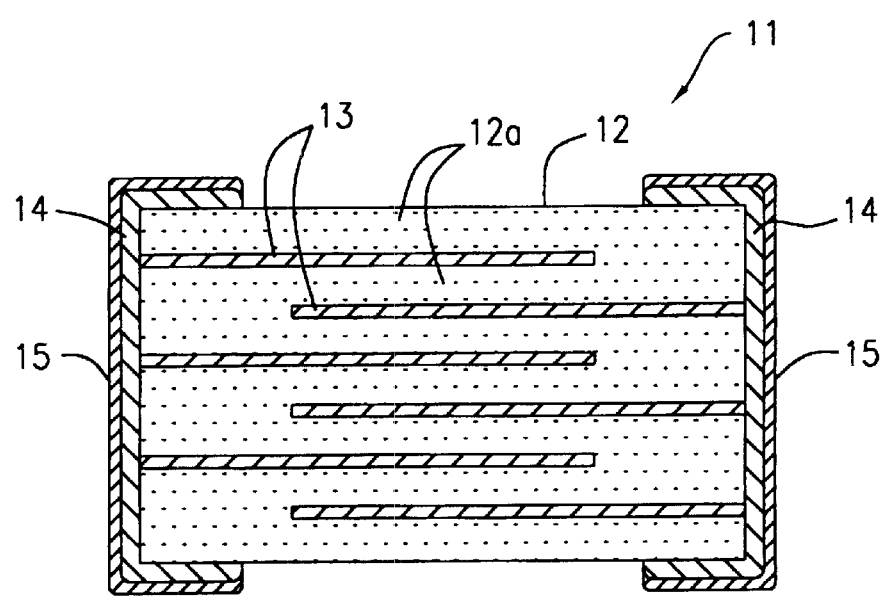
FIG. 2 is a sectional view of a ceramic electronic component according to another embodiment of the present invention.

Next, another embodiment of the ceramic electronic component according to the present invention will be explained in detail with reference to FIG. 2.

A ceramic electronic component 11 is composed of a ceramic element 12, internal electrodes 13, terminal electrodes 14, and plating films 15.

The ceramic element 12 is produced by baking a green ceramic element in which a plurality of green ceramic layers are laminated. A ceramic slurry made of dielectric material primarily containing $BaTiO_3$ is sheet-molded into ceramic moldings, and the resulting ceramic moldings are cut into a predetermined size so as to produce the green ceramic layers.

The internal electrodes 13 are located between ceramic layers 12a in the ceramic element 12, and are produced by the concurrent baking of a conductor paste and a green ceramic element in which the conductor paste is applied to a plurality of green ceramic layers by printing, and laminated together with the green ceramic layers. The end edge of each of the internal electrodes 13 is formed so as to expose at one of the end faces of the ceramic element 12.

The terminal electrodes 14 are produced by baking a conductive paste applied by coating to the end faces of the ceramic element 12 so as to electrically and mechanically connect to one end of each of the internal electrodes 13 exposed at the end faces of the ceramic element 12.

The plating films 15 are made of, for example, electroless plating of Sn, Ni, etc., and solder plating, and at least one layer thereof is formed on the terminal electrodes 14.

The material of the ceramic element 12 is not limited to the aforementioned embodiment, and the ceramic element 12 may be made of, for example, $PbZrO_3$ and other dielectric material, insulator, magnetic material, piezoelectric material and semiconductor. The number of lamination of the ceramic layers in the ceramic element 12 according to the present invention is not limited to the aforementioned embodiment, and an arbitrary number of layers may be laminated. The number of the internal electrodes 13 is not limited to the aforementioned embodiment. For example, the ceramic electronic component is not necessarily provided with the internal electrode, although an arbitrary number of layers may be formed. Furthermore, the internal electrodes 13 are not necessarily exposed at the end faces of the ceramic element 12, and are not necessarily electrically and mechanically connected to the terminal electrodes 14. The plating films 15 are not necessarily provided, although an arbitrary number of layers may be formed.

EXAMPLES

Examples Using an Anionic Polyurethane Resin

A ceramic molding was produced using a barium titanate powder as a ceramic material and using an anionic polyurethane resin as an organic binder. A ceramic material made of the barium titanate powder was combined with the organic binder made of the anionic polyurethane resin against as follows.

In general, relatively small quantities of metal ions are eluted from a ceramic slurry produced using a barium titanate powder. As a consequence, there is no fear of reaction between anionic groups in the anionic polyurethane resin and eluted metal ions, which cause gelation or increase in viscosity of the ceramic slurry. Therefore, when the polyurethane resin is used as the organic binder in the production of the ceramic slurry using the barium titanate powder, usually, the anionic polyurethane resin is adopted. The present embodiment followed the aforementioned customary manner.

The barium titanate powder was prepared as the ceramic material. As an organic vehicle of Examples 1 to 5, an anionic polyurethane resin emulsion composed of 30% by weight of anionic polyurethane resin (organic binder) having an average particle diameter of 100 to 500 nm and 70% by weight of aqueous solvent was prepared. In addition, a vinyl acetate resin emulsion composed of 50% by weight of vinyl acetate resin having an average particle diameter of 1,000 nm and 50% by weight of aqueous solvent as an organic vehicle of Comparative Examples 1, an acrylic resin emulsion composed of 30% by weight of acrylic resin having an average particle diameter of 100 nm and 70% by weight of aqueous solvent as an organic vehicle of Comparative Examples 2, a dispersing agent to uniformly disperse the materials, and an antifoamer to improve defoaming property were prepared.

100 parts by weight of ceramic material, the organic vehicle of Examples 1 to 5 and Comparative Examples 1 and 2 with the organic binder contents as shown in Table 1, 20 parts by weight of aqueous solvent, 1 part by weight of dispersing agent and 0.5 parts by weight of antifoamer were blended, and were mixed using a ball mill for 2 hours so as to produce ceramic slurries. The resulting ceramic slurries were defoamed, were sheet-molded using a doctor blade, and thereafter were dried so as to produce ceramic moldings of 0.2 mm in thickness of Examples 1 to 5 and Comparative Examples 1 and 2.

Figure 3:
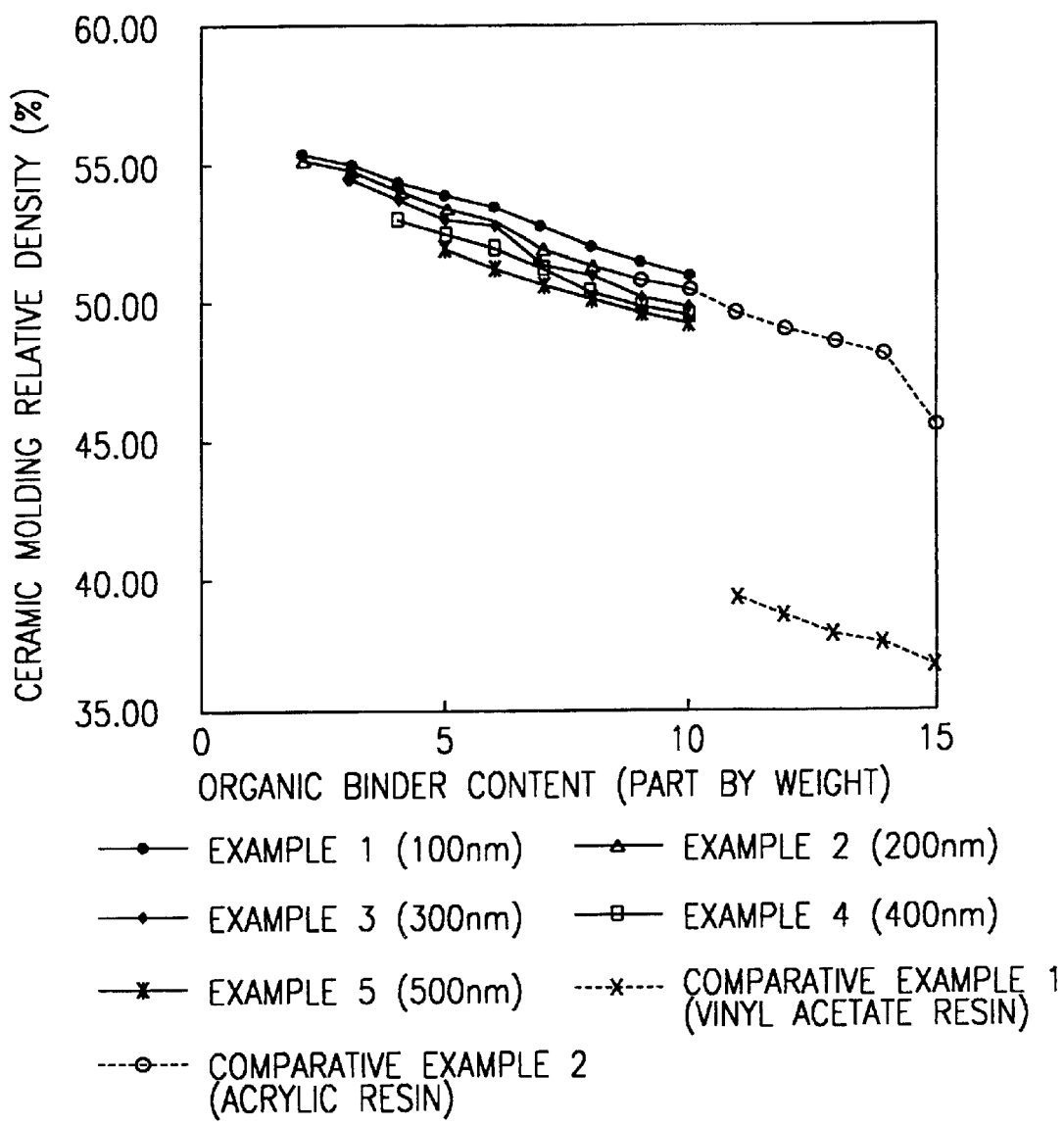
FIG. 3 is a graph showing the relationship between the contents of the organic binders and the relative densities of the ceramic moldings regarding Examples 1 to 5 of the present invention and Comparative Examples 1 and 2.
Figure 4:
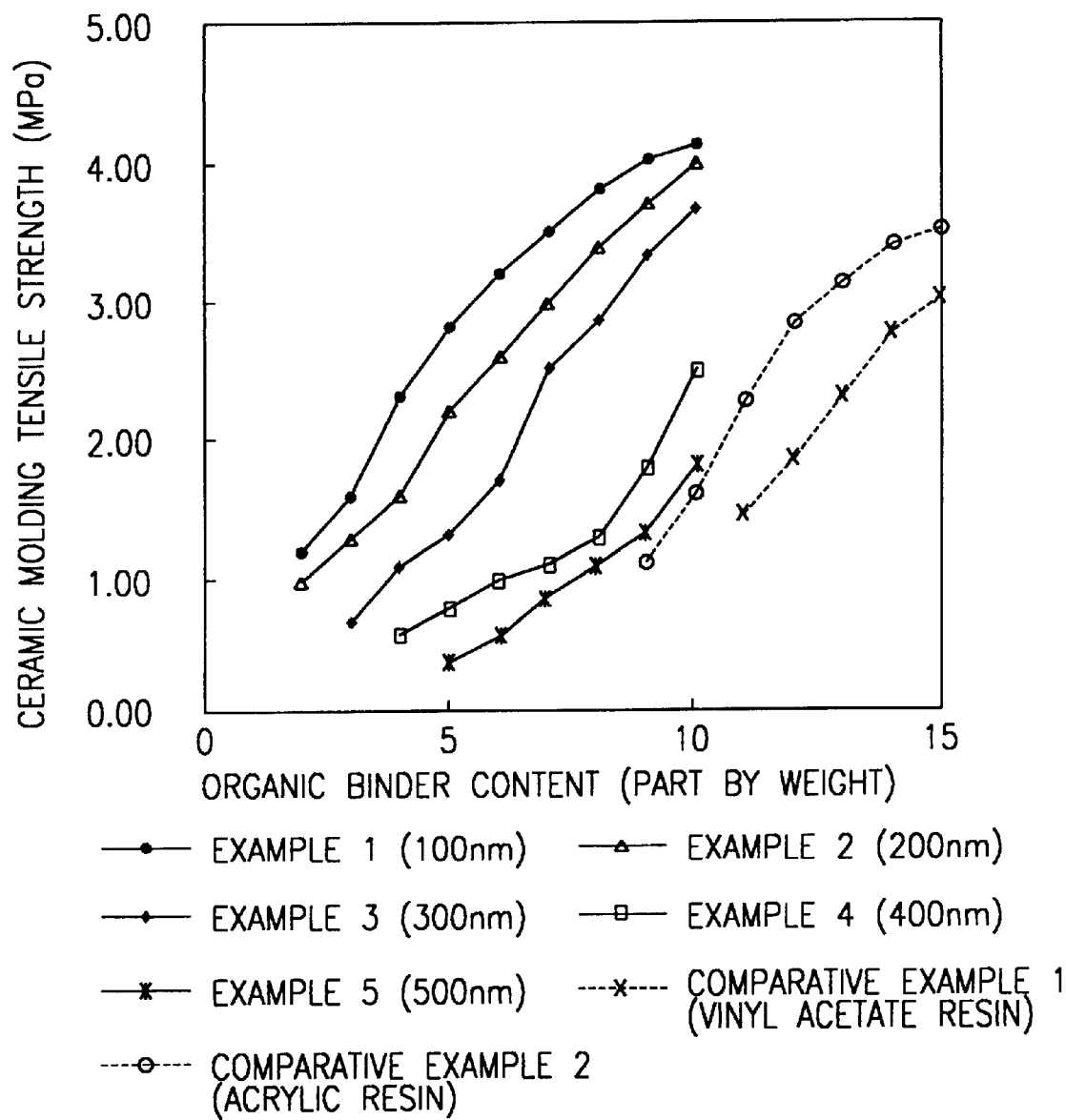
FIG. 4 is a graph showing the relationship between the contents of the organic binders and the tensile strengths of the ceramic moldings regarding Examples 1 to 5 of the present invention and Comparative Examples 1 and 2.
Figure 5:
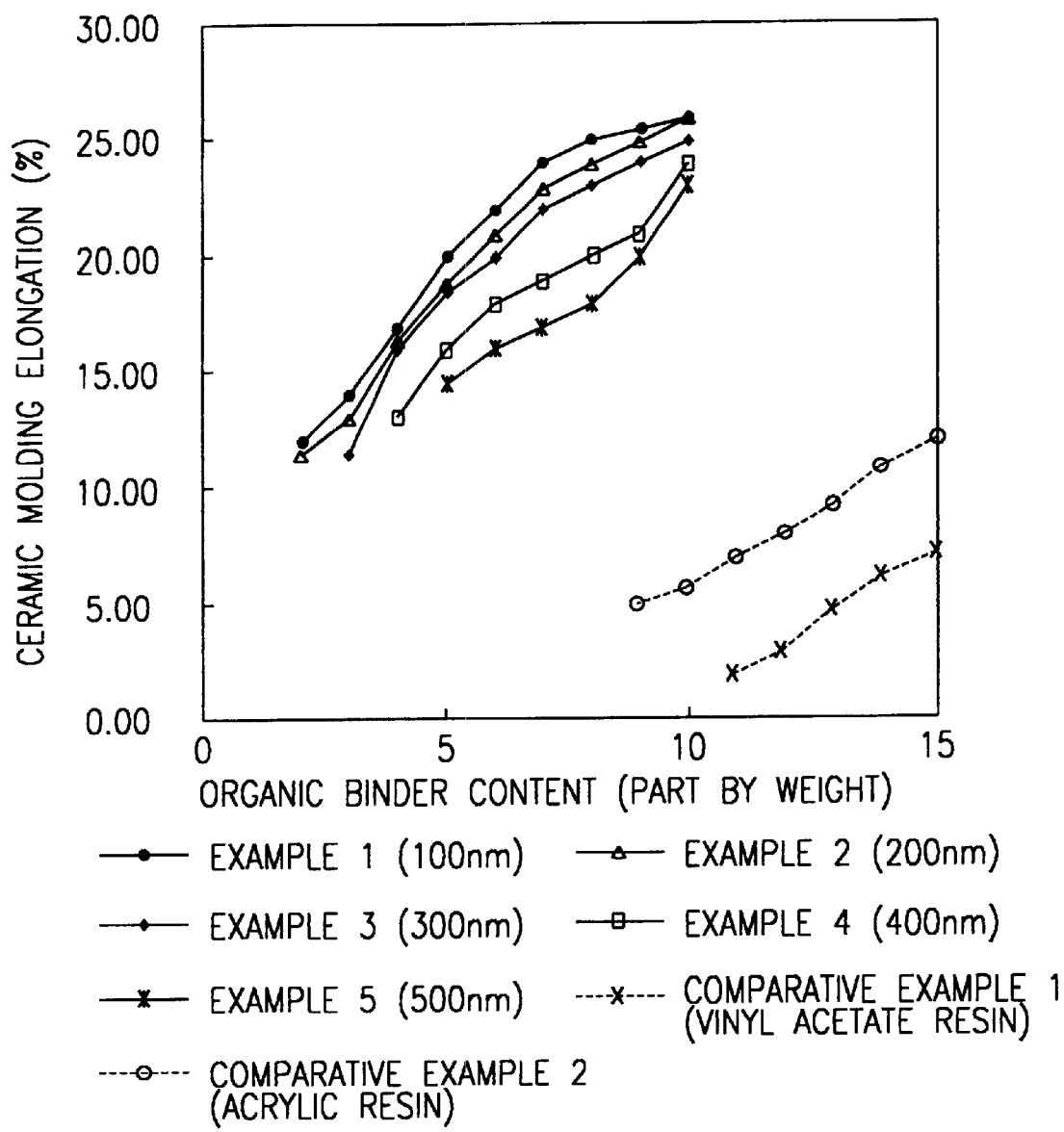
FIG. 5 is a graph showing the relationship between the contents of the organic binders and the elongations of the ceramic moldings regarding Examples 1 to 5 of the present invention and Comparative Examples 1 and 2.

Subsequently, relative densities (%), tensile strengths (MPa) and elongations (%) of the ceramic moldings of Examples 1 to 5 and Comparative Examples 1 and 2 were measured. The results thereof are summarized in Tables 1 to 3. Furthermore, based on Tables 1 to 3, the relationship between the contents of the organic binders and the relative densities of the ceramic moldings is shown in FIG. 3, the relationship between the contents of the organic binders and the tensile strengths of the ceramic moldings is shown in FIG. 4, and the relationship between the contents of the organic binders and the elongations of the ceramic moldings is shown in FIG. 5.

To determine the relative density, the ceramic molding was punched out to be 76.0 mm by 58.4 mm using a sheet punching machine, and relative density (%) was determined based on the die dimension, the thickness and the weight of the defatted material. For the theoretical density, the true specific gravity of the powder was taken as 5.83 $g/cm^3$.

To determine the tensile strength and the elongation, the ceramic molding was punched into the shape of the letter I of 40.0 mm by 12.0 mm (center portion width of 2 mm, concave portion length of 30 mm, and concave portion R of 5 mm) using a sheet punching machine, and this test piece was subjected to measurement using a tensile strength tester Tensilon UCT-1T manufactured by Orientec Corporation. In the measurement, the cross head speed was 5.0 mm/min and the measurement temperature was room temperature of 25° C.

TABLE 1

| Sample | | Name | Average Particle Diameter (nm) | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | | | Ceramic Molding Relative Density (%) | | | | | | | | | |
| Example | 1 | Anionic | 100 | 55.4 | 55.0 | 54.4 | 53.9 | 53.5 | 52.8 | 52.1 | 51.5 | 51.0 | | | | | |
| | 2 | Polyurethane | 200 | 55.2 | 54.8 | 54.1 | 53.9 | 53.0 | 52.0 | 51.5 | 51.0 | 50.5 | | | | | |
| | 3 | Resin | 300 | | | 54.5 | 53.8 | 53.0 | 52.8 | 51.5 | 51.0 | 50.2 | 49.8 | | | | |
| | 4 | | 400 | | | | 53.0 | 52.5 | 52.0 | 51.3 | 50.3 | 49.8 | 49.5 | | | | |
| | 5 | | 500 | | | | | 52.0 | 51.3 | 50.7 | 50.1 | 49.6 | 49.2 | | | | |
| Comparative Example | 1 | Vinyl Acetate Resin | 1000 | | | | | | | | | | 39.4 | 38.7 | 38.0 | 37.6 | 36.8 |
| | 2 | Acrylic Resin | 100 | | | | | | | | 50.8 | 50.5 | 49.6 | 49.0 | 48.5 | 48.0 | 45.5 |

As is clear from Table 1 and FIG. 3, the contents of the organic binders in the ceramic slurries and the relative densities of the ceramic moldings are in nearly inverse proportion. When comparisons are made among Examples 1 to 5 having different average particle diameters of the organic binder, it is clear that the relative density of the ceramic molding is increased as the average particle diameter of the organic binder used therefor decreases.

When the contents of the organic binders are the same, it is clear that the relative densities of the ceramic moldings of Examples 1 to 5 are slightly higher than the relative density of the ceramic molding of Comparative Example 2 in which the average particle diameter is the same with Examples, and are superior because these are higher than the relative density of the ceramic molding of Comparative Example 1 by about 20%, and it is clear that in order to achieve the same relative density, the content of the organic binder in the case where the anionic polyurethane resin or the acrylic resin is used as the organic binder can be smaller than that in the case where vinyl acetate resin is used.

ceramic molding is increased as the average particle diameter of the organic binder used therefor decreases.

When the contents of the organic binders are the same, it is clear that the tensile strengths of the ceramic moldings of Examples 1 to 5 are superior because these are higher than the tensile strengths of the ceramic moldings of Comparative Examples 1 and 2, and it is clear that in order to achieve the same tensile strength, the content of the organic binder in the case where the anionic polyurethane resin is used as the organic binder can be smaller than that in the case where the vinyl acetate resin or the acrylic resin are used.

TABLE 2

| | | | Organic Binder | | | | | | | | | | | | | |
|---|---|---|---|---|---|---|---|---|---|---|---|---|---|---|---|---|
| | | Average Particle | Content (part by weight) | | | | | | | | | | | | | |
| Sample | Name | Diameter (nm) | 2 | 3 | 4 | 5 | 6 | 7 | 8 | 9 | 10 | 11 | 12 | 13 | 14 | 15 |
| | | | Ceramic Molding Tensile Strength (MPa) | | | | | | | | | | | | | |
| Example 1 | Anionic | 100 | 1.20 | 1.60 | 2.30 | 2.80 | 3.20 | 3.50 | 3.80 | 4.00 | 4.10 | | | | | |
| 2 | Polyurethane | 200 | 1.00 | 1.30 | 1.60 | 2.20 | 2.60 | 3.00 | 3.40 | 3.70 | 4.00 | | | | | |
| 3 | Resin | 300 | | 0.70 | 1.10 | 1.30 | 1.70 | 2.50 | 2.90 | 3.30 | 3.70 | | | | | |
| 4 | | 400 | | | 0.60 | 0.80 | 1.00 | 1.10 | 1.30 | 1.80 | 2.50 | | | | | |
| 5 | | 500 | | | | 0.40 | 0.60 | 0.90 | 1.10 | 1.30 | 1.80 | | | | | |
| Comparative Example 1 | Vinyl Acetate Resin | 1000 | | | | | | | | | | 1.47 | 1.85 | 2.30 | 2.75 | 3.00 |
| 2 | Acrylic Resin | 100 | | | | | | | | | | 1.13 | 1.60 | 2.26 | 2.82 | 3.12 | 3.40 | 3.50 |

As is clear from Table 2 and FIG. 4, the contents of the organic binders in the ceramic slurries and the tensile strengths of the ceramic moldings are nearly directly proportional. When comparisons are made among Examples 1 to 5 having different average particle diameters of the organic binder, it is clear that the tensile strength of the

TABLE 3

| | | | Organic Binder | | | | | | | | | | | | | |
|---|---|---|---|---|---|---|---|---|---|---|---|---|---|---|---|---|
| | | Average Particle | Content (part by weight) | | | | | | | | | | | | | |
| Sample | Name | Diameter (nm) | 2 | 3 | 4 | 5 | 6 | 7 | 8 | 9 | 10 | 11 | 12 | 13 | 14 | 15 |
| | | | Ceramic Molding Elongation (%) | | | | | | | | | | | | | |
| Example 1 | Anionic | 100 | 12.0 | 14.0 | 17.0 | 20.0 | 22.0 | 24.0 | 25.0 | 25.5 | 26.0 | | | | | |
| 2 | Polyurethane | 200 | 11.5 | 13.0 | 16.5 | 19.0 | 21.0 | 23.0 | 24.0 | 25.0 | 26.0 | | | | | |
| 3 | Resin | 300 | | 11.5 | 16.0 | 18.5 | 20.0 | 22.0 | 23.0 | 24.0 | 25.0 | | | | | |
| 4 | | 400 | | | 13.0 | 16.0 | 18.0 | 19.0 | 20.0 | 21.0 | 24.0 | | | | | |
| 5 | | 500 | | | | 14.5 | 16.0 | 17.0 | 18.0 | 20.0 | 23.0 | | | | | |
| Comparative Example 1 | Vinyl Acetate Resin | 1000 | | | | | | | | | | 2.0 | 3.0 | 4.8 | 6.2 | 7.2 |
| 2 | Acrylic Resin | 100 | | | | | | | | | | 5.0 | 5.7 | 7.0 | 8.0 | 93.3 | 10.9 | 12.0 | portional. When comparisons are made among Examples 1 to 5 having different average particle diameters of the organic binder, it is clear that the tensile strength of the As is clear from Table 3 and FIG. 5, the contents of the organic binders in the ceramic slurries and the elongations of the ceramic moldings are nearly directly proportional. When comparisons are made among Examples 1 to 5 having different average particle diameters of the organic binder, it is clear that the elongation of the ceramic molding is increased as the average particle diameter of the organic binder used therefor is decreased.

When the contents of the organic binders are the same, it is clear that the elongations of the ceramic moldings of Examples 1 to 5 are superior because these are higher than the elongations of the ceramic moldings of Comparative Examples 1 and 2, and it is clear that in order to achieve the same elongation, the content of the organic binder in the case where the anionic polyurethane resin is used as the organic binder can be smaller than that in the case where the vinyl acetate resin or the acrylic resin is used.

The ceramic molding of Example 1 was cut into 80.0 mm by 60.0 mm so as to produce a green ceramic element. The resulting green ceramic element was defatted at a temperature being raised from 50° C. to 600° C. with a temperature raising rate as shown in Table 4 so as to produce a ceramic defatted material.

The quantity of carbon residue remaining in the resulting ceramic defatted material was measured and the ratio thereof relative to 100% by weight of organic binder in the ceramic slurry was determined. The results thereof are summarized as shown in Table 4.

A ceramic molding was produced using a ceramic slurry containing a cross-linking agent. That is, the aforementioned ceramic slurries of Examples 1 to 5 were produced. Water-dispersible polyisocyanate was prepared as a cross-linking agent, and 10% by weight of this was added relative to 100% by weight of anionic polyurethane resin so as to prepare ceramic slurries of Examples 6 to 10. The resulting ceramic slurries were sheet-molded in a manner similar to those in the aforementioned Examples 1 to 5 so as to produce ceramic moldings of Examples 6 to 10.

Figure 6:
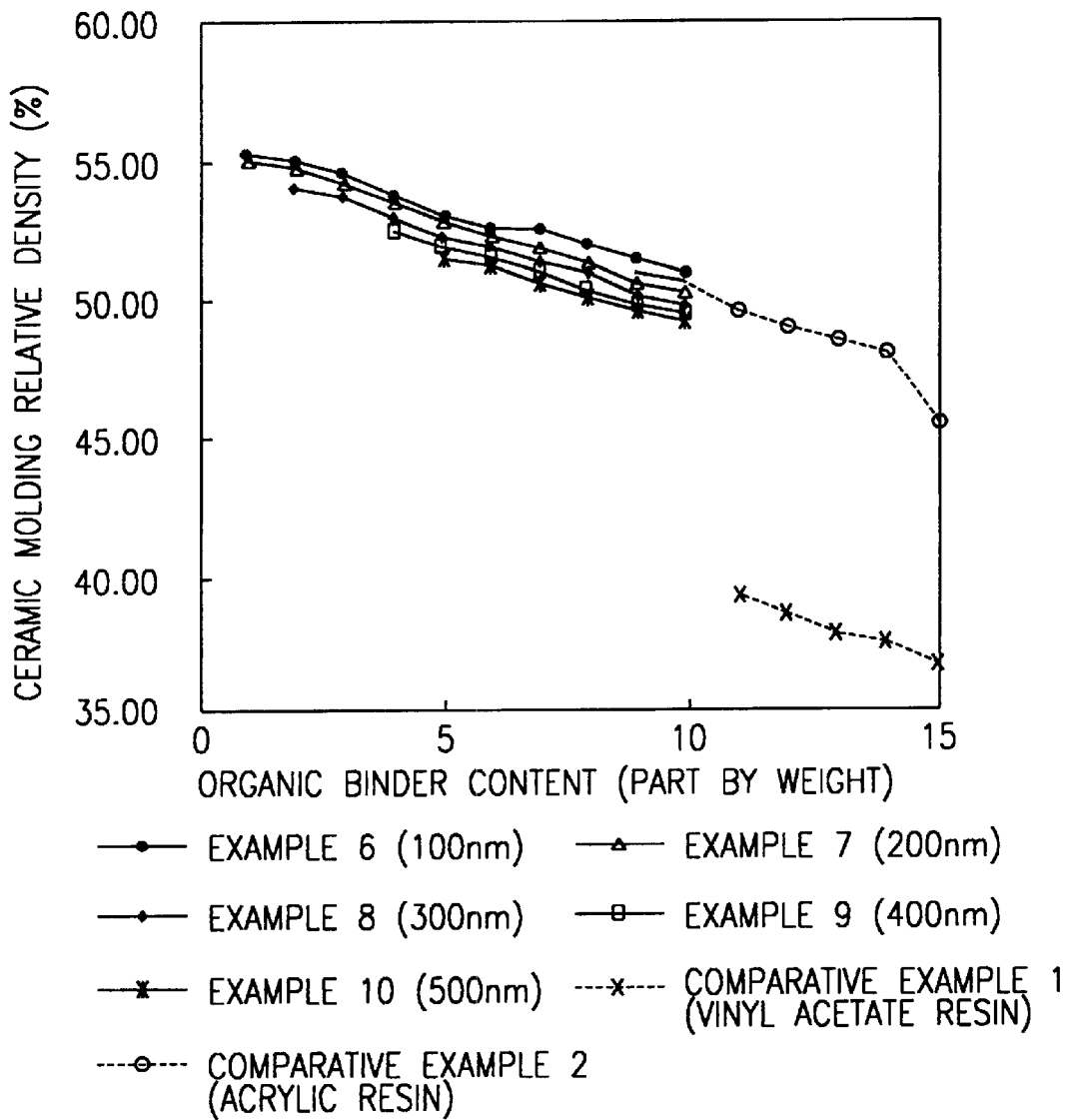
FIG. 6 is a graph showing the relationship between the contents of the organic binders and the relative densities of the ceramic moldings regarding Examples 6 to 10 of the present invention and Comparative Examples 1 and 2.
Figure 7:
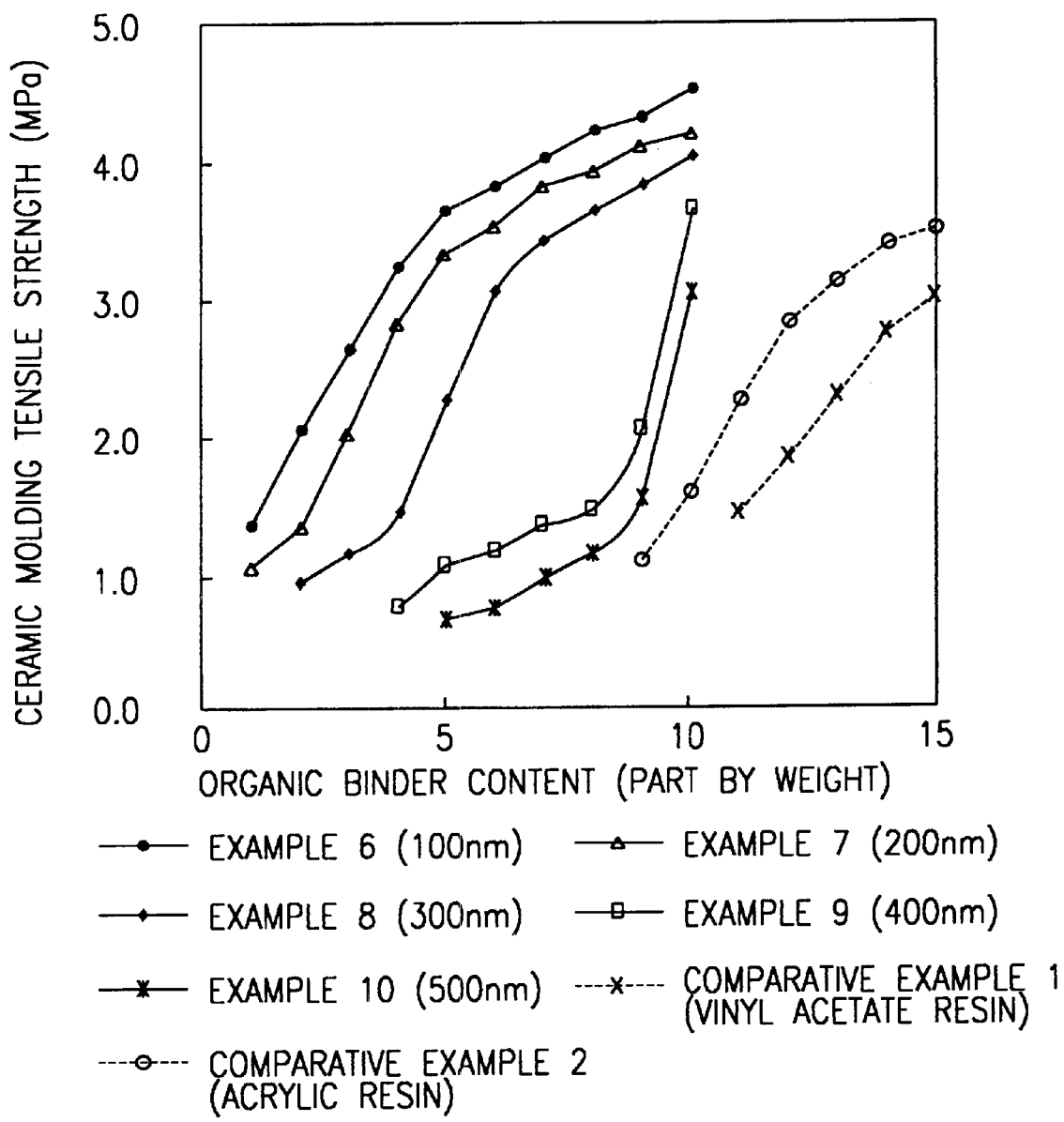
FIG. 7 is a graph showing the relationship between the contents of the organic binders and the tensile strengths of the ceramic moldings regarding Examples 6 to 10 of the present invention and Comparative Examples 1 and 2.
Figure 8:
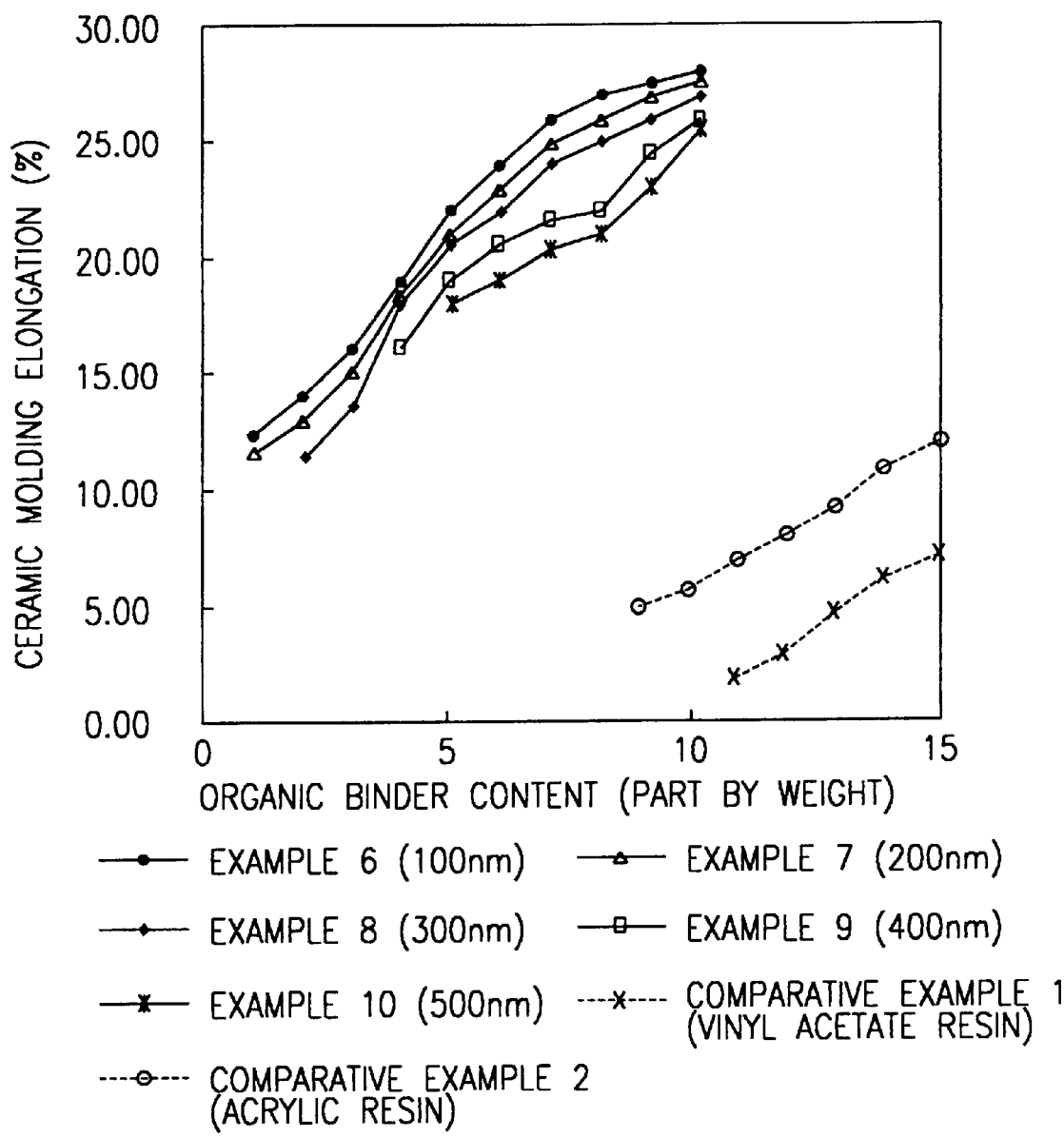
FIG. 8 is a graph showing the relationship between the contents of the organic binders and the elongations of the ceramic moldings regarding Examples 6 to 10 of the present invention and Comparative Examples 1 and 2.

Subsequently, relative densities (%), tensile strengths (MPa), and elongations (%) of Examples 6 to 10 were measured. The results thereof are summarized as Tables 5 to 7. Furthermore, based on Tables 5 to 7, the relationship between the contents of the organic binders and the relative densities of the ceramic moldings is shown in FIG. 6, the relationship between the contents of the organic binders and the tensile strengths of the ceramic moldings is shown in FIG. 7 and the relationship between the contents of the organic binders and the elongations of the ceramic moldings is shown in FIG. 8. The measurements of the relative density, the tensile strength, and the elongation were performed in a manner similar to those in the aforementioned Examples 1 to 5 and Comparable Examples 1 and 2.

TABLE 4

| Sample | Temperature Raising Rate (° C./min) | Organic Binder Content (part by weight) | | | | | | | | |
|---|---|---|---|---|---|---|---|---|---|---|
| | | 2 | 3 | 4 | 5 | 6 | 7 | 8 | 9 | 10 |
| | | Defatted Material Carbon Residue (wt %) | | | | | | | | |
| Example 1 | 1.83 | | 0.01 | | | | | | | 0.01 |
| | 2.04 | | 0.01 | | | | | | 0.01 | 0.01 |
| | 2.29 | | 0.01 | | | | 0.01 | 0.01 | 0.10* | 0.10* |
| | 2.62 | | 0.01 | | | 0.01 | 0.10* | 0.13* | | 0.15* |
| | 3.06 | 0.01 | 0.01 | 0.01 | 0.01 | 0.18* | | | | 0.17* |

(Note) Asterisk * indicates that defatting was insufficient.

As is clear from Table 4, when the content of the anionic polyurethane resin organic binder in the ceramic slurry is about 8 parts by weight or less relative to 100 parts by weight of ceramic powder, even if the temperature raising rate is 2.29° C./min, the carbon residue is 0.01% by weight or less, and therefore it is clear that defatting is sufficient. On the other hand, when the content exceeds about 8 parts by weight, it is clear that the improving effect on defatting property is reduced.

Likewise, based on the aforementioned results of the measurements, the relationship between the contents of the organic binders and the relative densities of the ceramic moldings of Comparative Examples 1 and 2 is also shown in FIG. 6, the relationship between the contents of the organic binders and the tensile strengths of the ceramic moldings is also shown in FIG. 7 and the relationship between the contents of the organic binders and the elongations of the ceramic moldings is also shown in FIG. 8.

TABLE 5

| | | Cross-Linking Agent | | Organic Binder | | | | | | | | | |
|---|---|---|---|---|---|---|---|---|---|---|---|---|---|
| | | | | Average Particle Diameter (nm) | Content (part by weight) | | | | | | | | |
| Sample | | Name | Content | | 1 | 2 | 3 | 4 | 5 | 6 | 7 | 8 | 9 | 10 |
| | | | | | Ceramic Molding Relative Density (%) | | | | | | | | | |
| Example | 6 | Water- | 10 parts by | 100 | 55.3 | 55.0 | 54.6 | 53.8 | 53.0 | 52.5 | 52.5 | 51.8 | 51.2 | 50.5 |
| | 7 | Dispersible | weight relative | 200 | 55.1 | 54.8 | 54.2 | 53.5 | 52.8 | 52.3 | 51.8 | 51.3 | 50.5 | 50.2 |
| | 8 | Polyisocyanate | to 100 parts by | 300 | | 54.0 | 53.6 | 52.9 | 52.2 | 51.8 | 51.2 | 50.8 | 49.8 | 49.5 |
| | 9 | | weight of | 400 | | | | 52.4 | 51.8 | 51.4 | 50.9 | 50.0 | 49.6 | 49.2 |
| | 10 | | Organic Binder | 500 | | | | | 51.4 | 51.0 | 50.4 | 49.8 | 49.8 | 48.8 |

As is clear from Table 5 and FIG. 6, the contents of the organic binders in the ceramic slurries and the relative densities of the ceramic moldings are in nearly inverse proportion even when the cross-linking agent is present. When comparisons are made among Examples 6 to 10 having different average particle diameters of the organic binder, it is clear that the relative density of the ceramic molding is increased accompanying a decrease in the average particle diameter of the organic binder used therefor.

When the contents of the organic binders are the same, it is clear that the relative densities of the ceramic moldings of Examples 6 to 10 are nearly equivalent to the relative density of the ceramic molding of Comparative Example 2, and are superior because these are higher than the relative density of the ceramic molding of Comparative Example 1 by about 20%, and it is clear that, in order to achieve the same relative density, the content of the organic binder in the case where the anionic polyurethane resin or the acrylic resin is used as the organic binder can be smaller than that in the case where the vinyl acetate resin is used.

Furthermore, it is clear that the relative densities of the ceramic moldings of Examples 1 to 5, which do not contain a cross-linking agent, as shown in Table 1 and FIG. 3 are higher, to some degree, than the relative densities of the ceramic moldings of Examples 6 to 10, which contain the cross-linking agent, as shown in Table 5 and FIG. 6. This is because when the cross-linking agent is present, shrinkage during drying is prevented due to the cross-linking, and accompanying this, the density is reduced by some degree.

When comparisons are made among Examples 6 to 10 having different average particle diameters of the organic binder, it is clear that the tensile strength of the ceramic molding is increased accompanying a decrease in the average particle diameter of the organic binder used therefor.

When the contents of the organic binders are the same, it is clear that the tensile strengths of the ceramic moldings of Examples 6 to 10 are superior because these are higher than the tensile strengths of the ceramic moldings of Comparative Examples 1 and 2, and it is clear that, in order to achieve the same tensile strength, the content of the organic binder in the case where the anionic polyurethane resin is used as the organic binder can be smaller than that in the case where the vinyl acetate resin or the acrylic resin is used.

When comparisons are made among the tensile strengths of the ceramic moldings of Examples 1 to 5, which do not contain the cross-linking agent, as shown in Table 2 and FIG. 4 and the tensile strengths of the ceramic moldings of Examples 6 to 10, which contain the cross-linking agent, as shown in Table 6 and FIG. 7, when the content of the organic binder is in the neighborhood of 5 parts by weight, improvement of strength by about 20 to 50% can be recognized. This is because a cross-linking structure is formed among the functional groups of the anionic polyurethane resin emulsion, that is, an organic vehicle.

TABLE 6

| Sample | | Cross-Linking Agent | | Average Particle Diameter (nm) | Organic Binder Content (part by weight) | | | | | | | | | |
|---|---|---|---|---|---|---|---|---|---|---|---|---|---|---|
| | | Name | Content | | 1 | 2 | 3 | 4 | 5 | 6 | 7 | 8 | 9 | 10 |
| | | | | | Ceramic Molding Tensile Strength (MPa) | | | | | | | | | |
| Example | 6 | Water- | 10 parts by | 100 | 1.30 | 2.00 | 2.60 | 3.20 | 3.60 | 3.80 | 4.00 | 4.20 | 4.30 | 4.50 |
| | 7 | Dispersible | weight relative | 200 | 1.00 | 1.30 | 2.00 | 2.80 | 3.30 | 3.50 | 3.80 | 3.90 | 4.10 | 4.20 |
| | 8 | Polyisocyanate | to 100 parts by | 300 | | 0.90 | 1.10 | 1.40 | 2.20 | 3.00 | 3.40 | 3.60 | 3.80 | 4.00 |
| | 9 | | weight of | 400 | | | | 0.70 | 1.00 | 1.10 | 1.30 | 1.40 | 2.00 | 3.60 |
| | 10 | | Organic Binder | 500 | | | | | 0.60 | 0.70 | 0.90 | 1.10 | 1.50 | 3.00 |

As is clear from Table 6 and FIG. 7, the contents of the organic binders in the ceramic slurries and the tensile strengths of the ceramic moldings are nearly directly proportional even when the cross-linking agent is present.

TABLE 7

| Sample | | Cross-Linking Agent | | Average Particle Diameter (nm) | Organic Binder Content (part by weight) | | | | | | | | | |
|---|---|---|---|---|---|---|---|---|---|---|---|---|---|---|
| | | Name | Content | | 1 | 2 | 3 | 4 | 5 | 6 | 7 | 8 | 9 | 10 |
| | | | | | Ceramic Molding Elongation (%) | | | | | | | | | |
| Example | 6 | Water- | 10 parts by | 100 | 12.3 | 14.0 | 16.0 | 19.0 | 22.0 | 24.0 | 26.0 | 27.0 | 27.5 | 28.0 |
| | 7 | Dispersible | weight relative | 200 | 11.6 | 13.0 | 15.0 | 18.5 | 21.0 | 23.0 | 25.0 | 26.0 | 27.0 | 27.7 |
| | 8 | Polyisocyanate | to 100 parts by | 300 | | | 11.4 | 13.5 | 18.0 | 20.5 | 22.0 | 24.0 | 25.0 | 26.0 | 27.0 |
| | 9 | | weight of | 400 | | | | | 16.0 | 19.0 | 20.5 | 21.5 | 22.0 | 24.5 | 26.0 |
| | 10 | | Organic Binder | 500 | | | | | | 18.0 | 19.0 | 20.3 | 21.0 | 23.0 | 25.6 |

As is clear from Table 7 and FIG. 8, the contents of the organic binders in the ceramic slurries and the elongations of the ceramic moldings are nearly directly proportional even when the cross-linking agent is present. When comparisons are made among Examples 6 to 10 having different average particle diameters of the organic binder, it is clear that the elongation of the ceramic molding is increased accompanying a decrease in the average particle diameter of the organic binder used therefor.

When the contents of the organic binders are the same, it is clear that the elongations of the ceramic moldings of Examples 6 to 10 are superior because these are higher than the elongations of the ceramic moldings of Comparative Examples 1 and 2, and it is clear that, in order to achieve the same elongation, the content of the organic binder in the case where the anionic polyurethane resin is used as the organic binder can be smaller than that in the case where the vinyl acetate resin or the acrylic resin is used.

When comparisons are made among the elongations of the ceramic moldings of Examples 1 to 5, which do not contain the cross-linking agent, as shown in Table 3 and FIG. 5 and the elongations of the ceramic moldings of Examples 6 to 10, which contain the cross-linking agent, as shown in Table 7 and FIG. 8, when the content of the organic binder is in the neighborhood of 5 parts by weight, improvement of elongation by about 10 to 25% can be recognized.

Examples Using a Nonionic Polyurethane Resin

Examples in which ceramic moldings were produced using a lead titanate zirconate powder as a ceramic material and using a nonionic polyurethane resin as an organic binder will be explained.

Herein, a ceramic material made of the lead titanate zirconate powder was combined with the organic binder made of the nonionic polyurethane resin as follows.

In general, relatively large quantities of metal ions are likely to be eluted from the ceramic slurry produced using the lead titanate zirconate powder. Therefore, when the polyurethane resin is used as the organic binder, usually a nonionic polyurethane resin including nonionic hydrophilic groups, which do not react with metal ions eluted from the ceramic slurry, is adopted. The present embodiment followed the aforementioned customary manner.

The lead titanate zirconate powder as the ceramic material, various resin emulsions of Examples 11 to 15 and Comparative Example 3 as an organic vehicle, a dispersing agent, and an antifoamer were prepared.

In Examples 11 to 15, the nonionic polyurethane resin emulsions was composed of 30% by weight of nonionic polyurethane resin having an average particle diameter of 100 to 500 nm and 70% by weight of aqueous solvent. In Comparative Example 3, used was an acrylic resin emulsion composed of 30% by weight of acrylic resin having an average particle diameter of 100 nm and 70% by weight of aqueous solvent.

Then, 100 parts by weight of lead titanate zirconate powder, the various resin emulsions of Examples 11 to 15 and Comparative Example 3 with the contents as shown in Table 8, 20 parts by weight of aqueous solvent, 1 part by weight of dispersing agent and 0.5 parts by weight of antifoamer were blended, and were mixed and pulverized using a ball mill for 24 hours so as to produce ceramic slurries. The resulting ceramic slurries were defoamed, were sheet-molded using a doctor blade, and thereafter, were dried so as to produce ceramic moldings of Examples 11 to 15 and Comparative Example 3 of 0.2 mm in thickness. Subsequently, relative densities (%), tensile strengths (MPa), and elongations (%) were measured. The results thereof are summarized in Tables 8 to 10. Furthermore, the ceramic moldings were baked so as to produce ceramic elements and pore area rates (%) and maximum pore diameters (μm) were measured and are summarized in Tables 11 and 12.

The measurements of the relative density, the tensile strength and the elongation were performed in a manner similar to those in the aforementioned Examples 1 to 10 and Comparative Examples 1 and 2. Regarding the theoretical density used for determining the relative density, the true specific gravity of the powder was taken as 8.0 g/cm$^3$.

As to the pore area rate and the maximum pore diameter, the surface of the sintered material was subjected to mirror finish using a precision polishing machine MA-300 manufactured by Musashino Denshi K. K., and was measured using a real time image analyzer manufactured by Nireco Corporation connected to a measure scope UM-2 manufactured by Nikon Corporation under a magnification of 50 times. In the present examples, pore area rate refers to a ratio of the field occupied by pores to the field of view, and maximum pore diameter refers to a diameter of the largest pore among pores in the field of view.

TABLE 8

| Sample | | Name | Average Particle Diameter (nm) | 2 | 3 | 4 | 5 | 6 | 7 | 8 | 9 | 10 | 11 | 12 |
|---|---|---|---|---|---|---|---|---|---|---|---|---|---|---|
| | | | | \multicolumn{12}{c}{Organic Binder Content (part by weight)} |
| | | | | \multicolumn{12}{c}{Ceramic Molding Relative Density (%)} |
| Example | 11 | Nonionic | 100 | 66.0 | 65.6 | 65.0 | 64.5 | 64.1 | 63.4 | 62.7 | 62.1 | 61.6 | | |
| | 12 | Polyurethane | 200 | 65.8 | 65.4 | 64.7 | 64.1 | 63.6 | 62.6 | 62.1 | 61.6 | 61.1 | | |
| | 13 | Resin | 300 | | 65.1 | 64.4 | 63.6 | 63.4 | 62.1 | 61.6 | 60.8 | 60.4 | | |
| | 14 | | 400 | | | 63.6 | 63.1 | 62.6 | 61.9 | 60.9 | 60.4 | 60.1 | | |
| | 15 | | 500 | | | | 62.6 | 61.9 | 61.3 | 60.7 | 60.2 | 59.8 | | |
| Comparative Example | 3 | Acrylic Resin | 100 | | | | | | | | 61.4 | 61.1 | 60.2 | 59.6 |

As is clear from Table 8, the contents of the organic binders in the ceramic slurries and the relative densities of the ceramic moldings are in nearly inverse proportion. When comparisons are made among Examples 11 to 15 having different average particle diameters of the organic binder, it is clear that the relative density is increased accompanying decrease in the average particle diameter of the organic binder. When the contents of the organic binders are the same, it is clear that the relative density of the ceramic molding of Example 11 is higher than the relative density of the ceramic molding of Comparative Example 3 in which the average particle diameter is the same with Example 11. Therefore, it can be said that in order to achieve the same relative density, the content of the organic binder in the case where the nonionic polyurethane resin emulsion is used as the organic binder can be smaller than that in the case where the acrylic resin emulsion is used.

As is clear from Table 10, the contents of the organic binders in the ceramic slurries and the elongations of the ceramic moldings are nearly directly proportional. When comparisons are made among Examples 11 to 15 having different average particle diameters of the organic binder, it is clear that the elongation is increased accompanying a decrease in the average particle diameter of the organic binder. When the contents of the organic binders are the same, it is clear that the elongation of the ceramic molding of Example 11 is greater than the elongation of the ceramic molding of Comparative Example 3 in which the average

TABLE 9

| Sample | | Organic Binder | | | | | | | | | | | |
|---|---|---|---|---|---|---|---|---|---|---|---|---|---|
| | | Name | Average Particle Diameter (nm) | Content (part by weight) | | | | | | | | | |
| | | | | 2 | 3 | 4 | 5 | 6 | 7 | 8 | 9 | 10 | 11 | 12 |
| | | | | Ceramic Molding Tensile Strength (MPa) | | | | | | | | | | |
| Example | 11 | Nonionic Polyurethane Resin | 100 | 1.8 | 2.2 | 2.9 | 3.4 | 3.8 | 4.1 | 4.4 | 4.6 | 4.7 | | |
| | 12 | | 200 | 1.6 | 1.9 | 2.2 | 2.8 | 3.2 | 3.6 | 4.0 | 4.3 | 4.6 | | |
| | 13 | | 300 | | 1.3 | 1.7 | 1.9 | 2.3 | 3.1 | 3.5 | 3.9 | 4.3 | | |
| | 14 | | 400 | | | 1.2 | 1.4 | 1.6 | 1.7 | 1.9 | 2.4 | 3.1 | | |
| | 15 | | 500 | | | | 1.0 | 1.2 | 1.5 | 1.7 | 1.9 | 2.4 | | |
| Comparative Example | 3 | Acrylic Resin | 100 | | | | | | | 1.7 | 2.2 | 2.9 | 3.4 | |

As is clear from Table 9, the contents of the organic binders in the ceramic slurries and the tensile strengths of the ceramic moldings are nearly directly proportional. When comparisons are made among Examples 11 to 15 having different average particle diameters of the organic binder, it is clear that the tensile strength is increased accompanying a decrease in the average particle diameter of the organic binder. When the contents of the organic binders are the same, it is clear that the tensile strength of the ceramic molding of Example 11 is higher than the tensile strength of the ceramic molding of Comparative Example 3 in which the average particle diameter is the same with Example 11. Therefore, it can be said that in order to achieve the same tensile strength, the content of the organic binder in the case where the nonionic polyurethane resin emulsion is used as the organic binder can be smaller than that in the case where the acrylic resin emulsion is used.

particle diameter is the same with Example 11. Therefore, it can be said that in order to achieve the same elongation, the content of the organic binder in the case where the nonionic polyurethane resin emulsion is used as the organic binder can be smaller than that in the case where the acrylic resin emulsion is used.

TABLE 10

| Sample | | Organic Binder | | | | | | | | | | | |
|---|---|---|---|---|---|---|---|---|---|---|---|---|---|
| | | Name | Average Particle Diameter (nm) | Content (part by weight) | | | | | | | | | |
| | | | | 2 | 3 | 4 | 5 | 6 | 7 | 8 | 9 | 10 | 11 | 12 |
| | | | | Ceramic Molding Elongation (%) | | | | | | | | | | |
| Example | 11 | Nonionic Polyurethane Resin | 100 | 14.5 | 16.5 | 19.5 | 22.5 | 24.5 | 26.5 | 27.5 | 28.0 | 28.5 | | |
| | 12 | | 200 | 14.0 | 15.5 | 19.0 | 21.5 | 23.5 | 25.5 | 26.5 | 27.5 | 28.5 | | |
| | 13 | | 300 | | 14.0 | 18.5 | 21.0 | 22.5 | 24.5 | 25.5 | 26.5 | 27.5 | | |
| | 14 | | 400 | | | 15.5 | 18.5 | 20.5 | 21.5 | 22.5 | 23.5 | 26.5 | | |
| | 15 | | 500 | | | | 17.0 | 18.5 | 19.5 | 20.5 | 22.5 | 25.5 | | |
| Comparative Example | 3 | Acrylic Resin | 100 | | | | | | | 7.5 | 8.2 | 9.5 | 10.5 | |

TABLE 11

| | | | Organic Binder | | | | | | | | | | |
|---|---|---|---|---|---|---|---|---|---|---|---|---|---|
| | | Average Particle Diameter (nm) | Content (part by weight) | | | | | | | | | | |
| | | | 2 | 3 | 4 | 5 | 6 | 7 | 8 | 9 | 10 | 11 | 12 |
| Sample | Name | | Ceramic Element Pore Area Rate (%) | | | | | | | | | | |
| Example 11 | Nonionic | 100 | 0.16 | 0.18 | 0.21 | 0.23 | 0.25 | 0.28 | 0.31 | 0.34 | 0.37 | | |
| 12 | Polyurethane | 200 | 0.17 | 0.19 | 0.22 | 0.25 | 0.27 | 0.32 | 0.34 | 0.37 | 0.39 | | |
| 13 | Resin | 300 | | 0.20 | 0.23 | 0.27 | 0.28 | 0.34 | 0.37 | 0.40 | 0.42 | | |
| 14 | | 400 | | | 0.27 | 0.30 | 0.32 | 0.35 | 0.40 | 0.42 | 0.44 | | |
| 15 | | 500 | | | | 0.32 | 0.35 | 0.38 | 0.41 | 0.43 | 0.45 | | |
| Comparative Example 3 | Acrylic Resin | 100 | | | | | | | | 0.37 | 0.39 | 0.43 | 0.46 |

As is clear from Table 11, the contents of the organic binders in the ceramic slurries and the pore area rates of the ceramic elements are nearly directly proportional. When comparisons are made among Examples 11 to 15 having different average particle diameters of the organic binder, it is clear that the pore area rate is reduced accompanying a decrease in the average particle diameter of the organic binder. When the contents of the organic binders are the same, it is clear that the pore area rate of the ceramic element of Example 11 is smaller than the pore area rate of the ceramic element of Comparative Example 3 in which the average particle diameter is the same with Example 11. Therefore, it can be said that the pore area rate in the case where the nonionic polyurethane resin emulsion is used as the organic binder becomes smaller than that in the case where the acrylic resin emulsion is used.

organic binder, it is clear that the maximum pore diameter is reduced accompanying a decrease in the average particle diameter of the organic binder. When the contents of the organic binders are the same, it is clear that the maximum pore diameter of the ceramic element of Example 11 is smaller than the maximum pore diameter of the ceramic element of Comparative Example 3 in which the average particle diameter is the same with Example 11. Therefore, it can be said that the maximum pore diameter in the case where the nonionic polyurethane resin emulsion is used as the organic binder becomes smaller than that in the case where the acrylic resin emulsion is used.

Each of the ceramic moldings of Example 11 and Comparative Example 3 was cut into a sample of 80.0 mm by 60.0 mm. The temperature of the resulting sample was raised

TABLE 12

| | | | Organic Binder | | | | | | | | | | |
|---|---|---|---|---|---|---|---|---|---|---|---|---|---|
| | | Average Particle Diameter (nm) | Content (part by weight) | | | | | | | | | | |
| | | | 2 | 3 | 4 | 5 | 6 | 7 | 8 | 9 | 10 | 11 | 12 |
| Sample | Name | | Ceramic Element Maximum Pore Diameter (μm) | | | | | | | | | | |
| Example 11 | Nonionic | 100 | 1.8 | 2.0 | 2.2 | 2.4 | 2.6 | 2.8 | 3.1 | 3.4 | 3.6 | | |
| 12 | Polyurethane | 200 | 1.9 | 2.0 | 2.3 | 2.6 | 2.8 | 3.2 | 3.4 | 3.6 | 3.8 | | |
| 13 | Resin | 300 | | 2.2 | 2.4 | 2.8 | 2.8 | 3.4 | 3.6 | 3.9 | 4.0 | | |
| 14 | | 400 | | | 2.8 | 3.0 | 3.2 | 3.4 | 3.8 | 4.0 | 4.2 | | |
| 15 | | 500 | | | | 3.2 | 3.4 | 3.7 | 3.9 | 4.1 | 4.3 | | |
| Comparative Example 3 | Acrylic Resin | 100 | | | | | | | | 3.6 | 3.8 | 4.1 | 4.4 |

As is clear from Table 12, the contents of the organic binders in the ceramic slurries and the maximum pore diameters of the ceramic elements are nearly directly proportional. When comparisons are made among Examples 11 to 15 having different average particle diameters of the from 50° C. to 600° C. with the temperature raising rate as shown in Table 13, and defatting was performed so as to produce a ceramic defatted material. The quantity of carbon residue remaining in the resulting ceramic defatted material was measured and summarized as shown in Table 13.

TABLE 13

| | | Temperature Raising Rate | \multicolumn{11}{c}{Organic Binder} |
| | | | \multicolumn{11}{c}{Content (part by weight)} |
| Sample | Name | (° C./min) | 2 | 3 | 4 | 5 | 6 | 7 | 8 | 9 | 10 | 11 | 12 |
| | | | \multicolumn{11}{c}{Ceramic Element Maximum Pore Diameter (μm)} |
|---|---|---|---|---|---|---|---|---|---|---|---|---|---|
| Example 11 | Nonionic Polyurethane Resin | 1.83 | 0.01 | 0.01 | 0.01 | 0.01 | 0.01 | 0.01 | 0.01 | 0.01 | 0.01 | | |
| | | 2.04 | 0.01 | 0.01 | 0.01 | 0.01 | 0.01 | 0.01 | 0.01 | 0.01 | 0.01 | | |
| | | 2.29 | 0.01 | 0.01 | 0.01 | 0.01 | 0.01 | 0.01 | 0.01 | 0.10* | 0.10* | | |
| | | 2.62 | 0.01 | 0.01 | 0.01 | 0.01 | 0.01 | 0.10* | 0.13* | * | * | | |
| | | 3.06 | 0.01 | 0.01 | 0.01 | 0.01 | 0.18* | * | * | * | * | | |
| Comparative Example 3 | Acrylic Resin | 1.83 | | | | | | | | 0.01 | 0.01 | 0.01 | 0.01 |
| | | 2.04 | | | | | | | | 0.01 | 0.01 | 0.02 | 0.12* |
| | | 2.29 | | | | | | | | 0.11* | 0.10* | 0.16* | 0 |
| | | 2.62 | | | | | | | | 0 | * | * | 0 |
| | | 3.06 | | | | | | | | 0 | * | * | 0 |

(Note) Asterisk * indicates that defatting was insufficient.

As is clear from Table 13, when the content of the organic binder in the ceramic slurry is about 8 parts by weight or less relative to 100 parts by weight of ceramic powder, even if the temperature raising rate is relatively low as 2.29° C./min, defatting is sufficiently performed and the carbon residue becomes 0.01% by weight or less. On the other hand, when the content of the organic binder exceeds about 8 parts by weight relative to 100 parts by weight of ceramic powder, it is clear that the improving effect on defatting property is reduced. There is not much difference between Example 11, in which the nonionic polyurethane resin emulsion was used as the organic binder, and Comparative Example 3, in which the acrylic resin emulsion was used, so that it is clear that the defatting property is roughly determined by the content of the organic binder.

Then, cross-linking agents were further added to the aforementioned ceramic slurries of Examples 11 to 15 so as to produce ceramic slurries of Examples 16 to 20. Water-dispersible polyisocyanate was used as the cross-linking agent and 10% by weight of it was added relative to 100% by weight of solid content of the nonionic polyurethane resin emulsion. The resulting ceramic slurries were sheet-molded in a manner similar to those in the aforementioned Example 11 to 15 so as to produce ceramic moldings. Subsequently, relative densities (%), tensile strengths (MPa), and elongations (%) were measured. The results thereof are summarized in Tables 14 to 16. Furthermore, pore area rates (%) and maximum pore diameters (μm) of the ceramic elements were measured. The results thereof are summarized as shown in Tables 17 and 18. The measurements of the relative density, the tensile strength, and the elongation of the molding and the pore area rate and the maximum pore diameter of the sintered material were performed in a manner similar to those in the aforementioned Examples 11 to 15 and Comparable Example 3. Regarding the relative density (%), the tensile strength (MPa), the elongation (%), the pore area rate (%), and the maximum pore diameter (μm) of the ceramic molding and the sintered material of Comparable Example 3, the values as shown in the aforementioned Tables 8 to 12 are also shown in Tables 14 to 18.

TABLE 14

| | | | | | \multicolumn{12}{c}{Organic Binder} |
| | \multicolumn{2}{c}{Cross-Linking Agent} | | Average Particle | \multicolumn{12}{c}{Content (part by weight)} |
| | | | | Diameter | 1 | 2 | 3 | 4 | 5 | 6 | 7 | 8 | 9 | 10 | 11 | 12 |
| Sample | Name | Content | Name | (nm) | \multicolumn{12}{c}{Ceramic Molding Relative Density (%)} |
|---|---|---|---|---|---|---|---|---|---|---|---|---|---|---|---|---|
| Example 16 | Water- | 10 parts | Nonionic | 100 | 65.9 | 65.6 | 65.2 | 64.4 | 63.6 | 63.1 | 63.1 | 62.4 | 61.8 | 61.1 | | |
| 17 | Disper- | by weight | Poly- | 200 | 65.7 | 65.4 | 64.8 | 64.1 | 63.4 | 62.9 | 62.4 | 61.9 | 61.1 | 60.8 | | |
| 18 | sible | relative to | urethane | 300 | | 64.6 | 64.2 | 63.5 | 62.8 | 62.4 | 61.8 | 61.4 | 60.4 | 60.1 | | |
| 19 | Polyiso- | 100 parts | Resin | 400 | | | | 63.0 | 62.4 | 62.0 | 61.5 | 60.6 | 60.2 | 59.8 | | |
| 20 | cyanate | by weight of Organic Binder | | 500 | | | | | 62.0 | 61.6 | 61.0 | 60.4 | 59.8 | 59.4 | | |
| Comparative Example | 3 | — | — | Acrylic Resin | 100 | | | | | | | | | 61.4 | 61.1 | 60.2 | 59.6 |

As is clear from Table 14, the contents of the organic binders in the ceramic slurries and the relative densities of the ceramic moldings are in nearly inverse proportion even when the cross-linking agent is present. Furthermore, it is clear that the relative densities of the ceramic moldings of Examples 16 to 20, which contain the cross-linking agent, as shown in Table 14 are lower to some degree than the relative densities of the ceramic moldings of Examples 11 to 15, which do not contain a cross-linking agent, as shown in Table 8. This is because when the cross-linking agent is used, shrinkage during drying is prevented due to the cross-linking, and accompanying this, the density is reduced by some degree.

As is clear from Table 16, the contents of the organic binders in the ceramic slurries and the elongations of the ceramic moldings are nearly directly proportional even when the cross-linking agent is used. When comparisons are made among the elongations of the ceramic moldings of Examples 11 to 15, which do not contain the cross-linking

TABLE 15

| | | Cross-Linking Agent | | Organic Binder | | | | | | | | | | | | | |
|---|---|---|---|---|---|---|---|---|---|---|---|---|---|---|---|---|---|
| | | | | | Average Particle Diameter | Content (part by weight) | | | | | | | | | | | |
| Sample | | Name | Content | Name | (nm) | 1 | 2 | 3 | 4 | 5 | 6 | 7 | 8 | 9 | 10 | 11 | 12 |
| | | | | | | Ceramic Molding Tensile Strength (MPa) | | | | | | | | | | | |
| Example | 16 | Water- | 10 parts | Nonionic | 100 | 1.9 | 2.6 | 3.2 | 3.8 | 4.2 | 4.4 | 4.6 | 4.8 | 4.9 | 5.1 | | |
| | 17 | Disper- | by weight | Poly- | 200 | 1.6 | 1.9 | 2.6 | 3.4 | 3.9 | 4.1 | 4.4 | 4.5 | 4.7 | 4.8 | | |
| | 18 | sible | relative to | urethane | 300 | | 1.5 | 1.7 | 2.0 | 2.8 | 3.6 | 4.0 | 4.2 | 4.4 | 4.6 | | |
| | 19 | Polyiso- | 100 parts | Resin | 400 | | | | 1.3 | 1.6 | 1.7 | 1.9 | 2.0 | 2.6 | 4.2 | | |
| | 20 | cyanate | by weight of Organic Binder | | 500 | | | | | 1.2 | 1.3 | 1.5 | 1.7 | 2.1 | 3.6 | | |
| Comparative Example | 3 | — | — | Acrylic Resin | 100 | | | | | | | | | 1.7 | 2.2 | 2.9 | 3.4 |

As is clear from Table 15, the contents of the organic binders in the ceramic slurries and the tensile strengths of the ceramic moldings are nearly directly proportional even when the cross-linking agent is used. When comparisons are made among the tensile strengths of the ceramic moldings of Examples 11 to 15, which do not contain the cross-linking agent, as shown in Table 9 and the tensile strengths of the ceramic moldings of Examples 16 to 20, which contain the cross-linking agent, as shown in Table 15, it is clear that those containing the cross-linking agent exhibit higher values. This is because a cross-linking structure is formed among the functional groups of the polyurethane resin emulsion.

agent, as shown in Table 10 and the elongations of the ceramic moldings of Examples 16 to 20, which contain the cross-linking agent, as shown in Table 16, it is clear that those containing the cross-linking agent exhibit greater values. This is because a cross-linking structure is formed among the functional groups of the polyurethane resin emulsion as described above.

TABLE 16

| | | Cross-Linking Agent | | Organic Binder | | | | | | | | | | | | | |
|---|---|---|---|---|---|---|---|---|---|---|---|---|---|---|---|---|---|
| | | | | | Average Particle Diameter | Content (part by weight) | | | | | | | | | | | |
| Sample | | Name | Content | Name | (nm) | 1 | 2 | 3 | 4 | 5 | 6 | 7 | 8 | 9 | 10 | 11 | 12 |
| | | | | | | Ceramic Molding Elongation (%) | | | | | | | | | | | |
| Example | 16 | Water- | 10 parts | Nonionic | 100 | 14.8 | 16.5 | 18.5 | 21.5 | 24.5 | 26.5 | 28.5 | 29.5 | 30.0 | 30.5 | | |
| | 17 | Disper- | by weight | Poly- | 200 | 14.1 | 15.5 | 17.5 | 21.0 | 23.5 | 25.5 | 27.5 | 28.5 | 29.5 | 30.2 | | |
| | 18 | sible | relative to | urethane | 300 | | 13.9 | 16.0 | 20.5 | 23.0 | 24.5 | 26.5 | 27.5 | 28.5 | 29.5 | | |
| | 19 | Polyiso- | 100 parts | Resin | 400 | | | | 18.5 | 21.5 | 23.0 | 24.0 | 24.5 | 27.0 | 28.5 | | |
| | 20 | cyanate | by weight of Organic Binder | | 500 | | | | | 20.5 | 21.5 | 22.8 | 23.5 | 25.5 | 28.1 | | |
| Comparative Example | 3 | — | — | Acrylic Resin | 100 | | | | | | | | | 7.5 | 8.2 | 9.5 | 10.5 |

TABLE 17

| | | Cross-Linking Agent | | Organic Binder | Average Particle Diameter | Content (part by weight) | | | | | | | | | | | |
|---|---|---|---|---|---|---|---|---|---|---|---|---|---|---|---|---|---|
| Sample | | Name | Content | Name | (nm) | 1 | 2 | 3 | 4 | 5 | 6 | 7 | 8 | 9 | 10 | 11 | 12 |
| | | | | | | Ceramic Molding Pore Area Rate (%) | | | | | | | | | | | |
| Example | 16 | Water- | 10 parts | Nonionic | 100 | 0.16 | 0.18 | 0.20 | 0.23 | 0.27 | 0.30 | 0.30 | 0.33 | 0.36 | 0.39 | | |
| | 17 | Disper- | by weight | Poly- | 200 | 0.17 | 0.19 | 0.22 | 0.25 | 0.28 | 0.30 | 0.33 | 0.35 | 0.39 | 0.40 | | |
| | 18 | sible | relative to | urethane | 300 | | | 0.23 | 0.24 | 0.28 | 0.31 | 0.33 | 0.36 | 0.37 | 0.42 | 0.44 | |
| | 19 | Polyiso- | 100 parts | Resin | 400 | | | | | 0.30 | 0.33 | 0.35 | 0.37 | 0.41 | 0.43 | 0.45 | |
| | 20 | cyanate | by weight of Organic Binder | | 500 | | | | | | 0.35 | 0.37 | 0.39 | 0.42 | 0.45 | 0.47 | |
| Comparative Example | 3 | — | — | Acrylic Resin | 100 | | | | | | | | | 0.37 | 0.39 | 0.43 | 0.46 |

As is clear from Table 17, the contents of the organic binders in the ceramic slurries and the pore area rates of the ceramic elements are nearly directly proportional even when the cross-linking agent is used. Furthermore, it is clear that the pore area rates of the ceramic elements of Examples 16 to 20, which contain the cross-linking agent, as shown in Table 17 are greater to some degree than the pore area rates of the ceramic elements of Examples 11 to 15, which do not contain a cross-linking agent, as shown in Table 11. This is because when the cross-linking agent is contained, the distance between the ceramic particles becomes greater due to the cross-linking.

As the organic vehicle, a dispersing agent and an antifoamer were prepared.

In Examples 21 and 22, nonionic polyurethane resin emulsions were composed of 30% by weight of nonionic polyurethane resin having an average particle diameter of 100 nm and 70% by weight of aqueous solvent. In Examples 23 and 24, used were anionic and nonionic polyurethane resin emulsions composed of 30% by weight of anionic and nonionic polyurethane resin having an average particle diameter of 100 nm and 70% by weight of aqueous solvent. In Examples 25 and 26, used were anionic polyurethane resin emulsions composed of 30% by weight of anionic

TABLE 18

| | | Cross-Linking Agent | | Organic Binder | Average Particle Diameter | Content (part by weight) | | | | | | | | | | | |
|---|---|---|---|---|---|---|---|---|---|---|---|---|---|---|---|---|---|
| Sample | | Name | Content | Name | (nm) | 1 | 2 | 3 | 4 | 5 | 6 | 7 | 8 | 9 | 10 | 11 | 12 |
| | | | | | | Ceramic Molding Maximum Pore Diameter ($\mu$m) | | | | | | | | | | | |
| Example | 16 | Water- | 10 parts | Nonionic | 100 | 1.8 | 2.0 | 2.1 | 2.4 | 2.8 | 3.0 | 3.0 | 3.2 | 3.5 | 3.8 | | |
| | 17 | Disper- | by weight | Poly- | 200 | 1.9 | 2.0 | 2.3 | 2.6 | 2.8 | 3.0 | 3.2 | 3.4 | 3.8 | 3.9 | | |
| | 18 | sible | relative to | urethane | 300 | | | 2.4 | 2.5 | 2.8 | 3.1 | 3.2 | 3.5 | 3.6 | 4.0 | 4.2 | |
| | 19 | Polyiso- | 100 parts | Resin | 400 | | | | | 3.0 | 3.2 | 3.4 | 3.6 | 4.0 | 4.1 | 4.3 | |
| | 20 | cyanate | by weight of Organic Binder | | 500 | | | | | | 3.4 | 3.6 | 3.8 | 4.0 | 4.3 | 4.4 | |
| Comparative Example | 3 | — | — | Acrylic Resin | 100 | | | | | | | | | 3.6 | 3.8 | 4.1 | 4.4 |

As is clear from Table 18, the contents of the organic binders in the ceramic slurries and the maximum pore diameters of the ceramic elements are nearly directly proportional even when the cross-linking agent is used. Furthermore, it is clear that the maximum pore diameters of the ceramic elements of Examples 16 to 20, which contain the cross-linking agent, as shown in Table 18 are greater to some degree than the maximum pore diameters of the ceramic elements of Examples 11 to 15, which do not contain a cross-linking agent, as shown in Table 12. This is because when the cross-linking agent is contained, the distance between the ceramic particles becomes greater due to the cross-linking.

Examples Using Each of an Anionic, Nonionic and Anionic and Nonionic Polyurethane Resin A lead titanate zirconate powder as the ceramic material, various polyurethane resin emulsions of Examples 21 to 26 polyurethane resin having an average particle diameter of 100 nm and 70% by weight of aqueous solvent.

While in the present examples, an "anionic and nonionic" polyurethane resin emulsion refers to an emulsion in which the polyurethane resin including anionic carboxylic groups as well as nonionic ether groups has self-emulsified, an emulsion in which a nonionic surfactant is applied to a polyurethane resin including carboxylic groups and forced emulsification has been performed may be used.

Then, 100 parts by weight of lead titanate zirconate powder, 5 parts by weight of polyurethane resin emulsions of Examples 21 to 26, 20 parts by weight of aqueous solvent, 1 part by weight of dispersing agent and 0.5 parts by weight of antifoamer were blended, and were mixed using a ball mill for 2 hours so as to produce ceramic slurries. The resulting ceramic slurries were defoamed, were sheet-molded using a doctor blade, and thereafter, were dried so as to produce ceramic moldings of Examples 21 to 26 of 0.2 mm in thickness.

Subsequently, the ceramic moldings of Examples 21 to 26 were cut to 80.0 mm by 60.0 mm pieces so as to produce green ceramic elements. The resulting green ceramic elements were baked so as to produce ceramic elements of Examples 21 to 26.

The average particle diameters of the materials and quantities of the eluted metal ions were measured of the ceramic slurries of Examples 21 to 26 and the relative densities, tensile strengths and elongations of the ceramic moldings were measured. Furthermore, the pore area rates and maximum pore diameters of the ceramic elements were measured. The results thereof are summarized in Table 19.

The average particle diameter of the material was measured using a Laser Scattering Particle Size Distribution Analyzer manufactured by Horiba, Ltd. Regarding the measurement of the quantity of the eluted metal ion, the supernatant liquid was taken from the ceramic slurry separated using a centrifugal separator and the quantity of the Pb ion, the elution quantity of which was assumed to be especially large, was measured using an inductively coupled plasma emission spectrometer. The measurement of the relative density, the tensile strength, the elongation, the pore area rate, and the maximum pore diameter were performed in a manner similar to those in the aforementioned Examples 11 to 15.

and 19.8% to 22.5%, respectively, while for Examples 25 and 26, those are 1.8 to 2.8 MPa and 14.0% to 20.0%, respectively. Therefore, it is clear that the ceramic moldings of Examples 25 and 26 have the tensile strengths and the elongations smaller than those of the ceramic moldings of Examples 21 to 24.

The pore area rates and the maximum pore diameters of the ceramic elements of the ceramic elements of Examples 21 to 24 are 0.23% to 0.30% and 2.4 to 3.3 µm, respectively, while those of the ceramic elements of Examples 25 and 26 are 0.30% to 0.95% and 3.2% to 4.4%, respectively. Therefore, it is clear that the ceramic elements of Examples 25 and 26 have the pore area rates and the maximum pore diameters greater than those of the ceramic elements of Examples 21 to 24.

Deserving special note is that in Example 22 in which the nonionic polyurethane resin is used as the organic binder and the eluted metal quantity is 1,500 ppm, each of the relative density, the tensile strength and the elongation of the ceramic molding, and each of the pore area rate and the maximum pore diameter of the ceramic element is improved compared to that in Example 21 in which the same organic binder is used and the eluted metal quantity is relatively small as 200 ppm. That is, the relative density, the tensile strength, the elongation, the pore area rate, and the maximum pore diameter in Example 22 are improved by 0.2 points, 0.2 points, 0.5 points, 0.04 points and 0.4 points, respectively, compared to those in Example 21. When these values are converted to improvement rates of Example 22

TABLE 19

| Sample | | Organic Binder | | | Ceramic Slurry | | Ceramic Molding | | | Ceramic Element | |
|---|---|---|---|---|---|---|---|---|---|---|---|
| | | | | | Material | | | | | | |
| | Name | Ionicity | Average Particle Diameter (nm) | Content (part by weight) | Average Particle Diameter (nm) | Eluted Metal Quantity (ppm) | Relative Density (%) | Tensile Strength (MPa) | Elongation (%) | Pore Area Rate (%) | Maximum Pore Diameter (µm) |
| Example 21 | Polyurethane Resin | Nonionic | 100 | 5 | 800 | 200 | 64.3 | 3.2 | 22.0 | 0.27 | 2.8 |
| 22 | | | | | 500 | 1500 | 64.5 | 3.4 | 22.5 | 0.23 | 2.4 |
| 23 | | Anionic and Nonionic | | | 800 | 200 | 64.2 | 3.0 | 21.5 | 0.28 | 3.1 |
| 24 | | | | | 500 | 1500 | 64.0 | 2.6 | 19.8 | 0.30 | 3.3 |
| 25 | | Anionic | | | 800 | 200 | 64.0 | 2.8 | 20.0 | 0.30 | 3.2 |
| 26 | | | | | 500 | 1500 | 61.0 | 1.8 | 14.0 | 0.95 | 4.4 |

As is clear from Table 19, the ceramic slurries of Examples 21, 23 and 25, in which the average particle diameters of the material are the same, coincide with each other in the eluted metal quantity of 200 ppm, and the ceramic slurries of Examples 22, 24 and 26, in which the average particle diameters of the material are the same, coincide with each other in the eluted metal quantity of 1,500 ppm. The relative densities of the ceramic moldings of Examples 21 and 22 using the nonionic polyurethane resin as the organic binder are 64.3% to 64.5%. The relative densities of the ceramic moldings of Examples 23 and 24 using the anionic and nonionic polyurethane resin are 64.0% to 64.2%.

On the other hand, the relative densities of the ceramic moldings of Examples 25 and 26 using the anionic polyurethane resin are 61.0% to 64.0%. Therefore, it is clear that the ceramic moldings of Examples 25 and 26 have the relative densities lower, although by a small degree, than those of the ceramic moldings of Examples 21 to 24.

Regarding the ceramic moldings of Examples 21 to 24, the tensile strengths and the elongations are 2.6 to 3.4 MPa relative to Example 21, these are improved by 0.3%, 6.3%, 2.3%, 14.8% and 14.3%, respectively.

This is because the effect of the material average particle diameter of Example 22 being smaller than that of Example 21 is exhibited, and this indicates that decrease in the relative density, the tensile strength and the elongation of the ceramic molding and increase of pores and the maximum pore diameter of the ceramic element due to the elution of metal do not occur.

On the other hand, each of the relative density, the tensile strength, and the elongation of the ceramic molding of Example 24 (in which the anionic and nonionic polyurethane resin is used as the organic binder and the eluted metal quantity is 1,500 ppm) and each of the pore area rate and the maximum pore diameter of the ceramic element is reduced compared to that in Example 23 in which the same organic binder is used and the eluted metal quantity is relatively small as 200 ppm. That is, the relative density, the tensile strength, the elongation, the pore area rate, and the maximum pore diameter in Example 24 are reduced by 0.2 points, 0.4 points, 1.7 points, 0.02 points and 0.2 points, respectively, compared to those in Example 23. When these values are converted to reduction rates of Example 24 relative to Example 23, these are reduced by 0.3%, 13.3%, 7.9%, 7.1% and 6.5%, respectively.

In Example 26 in which the anionic polyurethane resin is used as the organic binder and the eluted metal quantity is 1,500 ppm, each of the relative density, the tensile strength and the elongation of the ceramic molding, and each of the pore area rate and the maximum pore diameter of the ceramic element is reduced compared to that in Example 25 in which the same organic binder is used and the eluted metal quantity is relatively small as 200 ppm. That is, the relative density, the tensile strength, the elongation, the pore area rate and the maximum pore diameter in Example 26 are reduced by 3.0 points, 1.0 point, 6.0 points, 0.65 points, and 1.2 points, respectively, compared to those in Example 25. When these values are converted to reduction rates of Example 26 relative to Example 25, these are reduced by 4.7%, 35.7%, 30.0%, 216.7%, and 37.5%, respectively.

As described above, the reduction rate of Example 26 relative to Example 25 is clearly greater than the reduction rate of Example 24 relative to Example 23. This indicates that the effect of the elution of metal is larger than the effect of the material average particle diameter, Example 26 being smaller than that of Example 25.

According to the ceramic slurry composition of the present invention, the content of the organic binder, that is, the content of the polyurethane resin, in the ceramic slurry can be reduced, lumps of coagulated surplus organic binder are reduced, and superior tensile strength and elongation can be provided. Consequently, when this is baked in order to produce a ceramic electronic component, the organic binder can be heated and removed in a short time, and furthermore, the degree of shrinkage accompanying the sintering of the ceramic molding is reduced, so that a ceramic electronic component in which deformation and warp are reduced can be produced.

By specifying the average particle diameter of the polyurethane resin to be about 300 nm or less, superior tensile strength and elongation can be provided and the content of the organic binder can be further reduced.

By specifying the content of the organic binder in the aforementioned ceramic slurry to be about 8 parts by weight or less relative to 100 parts by weight of the ceramic powder, superior tensile strength and elongation can be provided in spite of further reduced content of the organic binder.

When the aforementioned ceramic slurry is further composed of a cross-linking agent, further superior tensile strength and elongation can be provided in spite of the reduced content of the organic binder.

In the ceramic molding according to the present invention, when the solvent in the ceramic slurry contains water, an organic binder composed of a resin selected from the group consisting of the anionic polyurethane resin, the nonionic polyurethane resin and the anionic and nonionic polyurethane resin can be used. Among these, when the nonionic polyurethane resin or the anionic and nonionic polyurethane resin is used, there is no fear of reaction between metal ions eluted from the ceramic powder in the ceramic slurry and hydrophilic groups. Therefore, it is not necessary to add an excessive additive, etc., and reduction of the density of the ceramic molding can be prevented. In addition, increase of pores and increase in pore diameter in the ceramic element produced by baking the ceramic molding can be prevented.

What is claimed is:

1. A ceramic slurry composition comprising:
   a ceramic powder; and
   an organic vehicle comprising a polyurethane resin organic binder and a solvent,
   wherein said organic vehicle is an emulsion state in which fine particles of said polyurethane resin having an average particle diameter of about 100 nm or less are dispersed in said solvent.

2. A ceramic slurry composition according to claim 1, wherein the content of said polyurethane resin in said ceramic slurry is about 8 parts by weight or less relative to 100 parts by weight of said ceramic powder.

3. A ceramic slurry composition according to claim 2, further comprising a cross-linking agent.

4. A ceramic slurry composition according to claim 3, wherein said solvent comprises water.

5. A ceramic slurry composition according to claim 4, wherein said polyurethane resin is selected from the group consisting of an anionic polyurethane resin, a nonionic polyurethane resin, and an anionic and nonionic polyurethane resin.

6. A ceramic slurry composition according to claim 1, wherein the content of said polyurethane resin in said ceramic slurry is about 8 parts by weight or less relative to 100 parts by weight of said ceramic powder.

7. A ceramic slurry composition according to claim 6, wherein the content of said polyurethane resin in said ceramic slurry is about 7 parts by weight or less relative to 100 parts by weight of said ceramic powder.

8. A ceramic slurry composition according to claim 1, further comprising a cross-linking agent.

9. A ceramic slurry composition according to claim 1, wherein said solvent comprises water.

10. A ceramic slurry composition according to claim 1, wherein said polyurethane resin is selected from the group consisting of an anionic polyurethane resin, a nonionic polyurethane resin, and an anionic and nonionic polyurethane resin.

11. A ceramic slurry composition according to claim 1, wherein the content of said polyurethane resin in said ceramic slurry is about 6 parts by weight or less relative to 100 parts by weight of said ceramic powder.

12. A ceramic slurry composition according to claim 1, wherein the content of said polyurethane resin in said ceramic slurry is about 5 parts by weight or less relative to 100 parts by weight of said ceramic powder.

13. A ceramic slurry composition according to claim 1, wherein said polyurethane resin is anionic and said ceramic powder comprises barium titanate.

14. A ceramic slurry composition according to claim 1, wherein said polyurethane resin is nonionic and said ceramic powder comprises lead titanate zirconate.

15. A ceramic molding comprising a shaped ceramic slurry composition according to claim 1.

16. A ceramic molding according to claim 15, wherein said ceramic molding is a dried ceramic green sheet.

17. A ceramic electronic component, comprising:
    a ceramic element comprising a baked ceramic molding according to claim 15; and
    at least one terminal electrode in contact with said ceramic.

18. A ceramic electronic component according to claim 17, wherein said ceramic element is a baked laminate comprising a plurality of layers of said ceramic molding.

19. A ceramic molding comprising a shaped ceramic slurry composition according to claim 5.

* * * * *